United States Patent
Nakamura et al.

(10) Patent No.: US 8,321,622 B2
(45) Date of Patent: Nov. 27, 2012

(54) STORAGE SYSTEM WITH MULTIPLE CONTROLLERS AND MULTIPLE PROCESSING PATHS

(75) Inventors: Shuji Nakamura, Hino (JP); Emi Nakamura, legal representative, Hino (JP); Masahiro Arai, Machida (JP); Hideaki Fukuda, Odawara (JP); Nobuyuki Minowa, Oi (JP)

(73) Assignee: Hitachi, Ltd., Tokyo (JP)

( * ) Notice: Subject to any disclaimer, the term of this patent is extended or adjusted under 35 U.S.C. 154(b) by 298 days.

(21) Appl. No.: 12/668,721

(22) PCT Filed: Nov. 10, 2009

(86) PCT No.: PCT/JP2009/005995
§ 371 (c)(1),
(2), (4) Date: Jan. 12, 2010

(87) PCT Pub. No.: WO2011/058598
PCT Pub. Date: May 19, 2011

(65) Prior Publication Data
US 2011/0246720 A1    Oct. 6, 2011

(51) Int. Cl.
*H04L 12/50* (2006.01)
(52) U.S. Cl. .... 711/100; 710/22; 709/227; 711/E12.002
(58) Field of Classification Search .................. 711/112, 711/100, 154, E12.002, 111, 110; 710/22; 709/227
See application file for complete search history.

(56) References Cited

U.S. PATENT DOCUMENTS

| | | | |
|---|---|---|---|
| 6,182,198 B1 * | 1/2001 | Hubis et al. | 711/162 |
| 6,842,829 B1 | 1/2005 | Nichols et al. | |
| 6,944,684 B1 | 9/2005 | Kinjo et al. | |
| 7,817,626 B2 * | 10/2010 | Nakamura et al. | 711/111 |
| 7,917,668 B2 * | 3/2011 | Hosoya et al. | 710/22 |
| 2002/0152355 A1 | 10/2002 | Otterness et al. | |
| 2004/0019686 A1 * | 1/2004 | Toyoda et al. | 709/229 |
| 2008/0126698 A1 * | 5/2008 | Honda | 711/114 |
| 2008/0183871 A1 | 7/2008 | Ogawa | |
| 2009/0204743 A1 * | 8/2009 | Inoue et al. | 711/100 |

FOREIGN PATENT DOCUMENTS

| | | |
|---|---|---|
| EP | 1 372 076 A2 | 12/2003 |
| EP | 1 818 794 A2 | 8/2007 |
| JP | 2001-43026 A | 2/2001 |
| JP | 2008-186108 A | 8/2008 |

* cited by examiner

*Primary Examiner* — Pierre-Michel Bataille
(74) *Attorney, Agent, or Firm* — Mattingly & Malur, PC

(57) ABSTRACT

The first controller includes a first relay circuit which is a circuit that controls data transfer, and a first processor coupled to the first relay circuit via a first second path. The second controller includes a second relay circuit which is a circuit that controls data transfer, and is coupled to the first relay circuit via the first path, and a second processor coupled to the second relay circuit via a second second path. The first processor is coupled to the second relay circuit not via the first relay circuit but via a first third path, and accesses the second relay circuit via the first third path during an I/O process. The second processor is coupled to the first relay circuit not via the second relay circuit but via a second third path, and accesses the first relay circuit via the second third path during an I/O process.

14 Claims, 17 Drawing Sheets

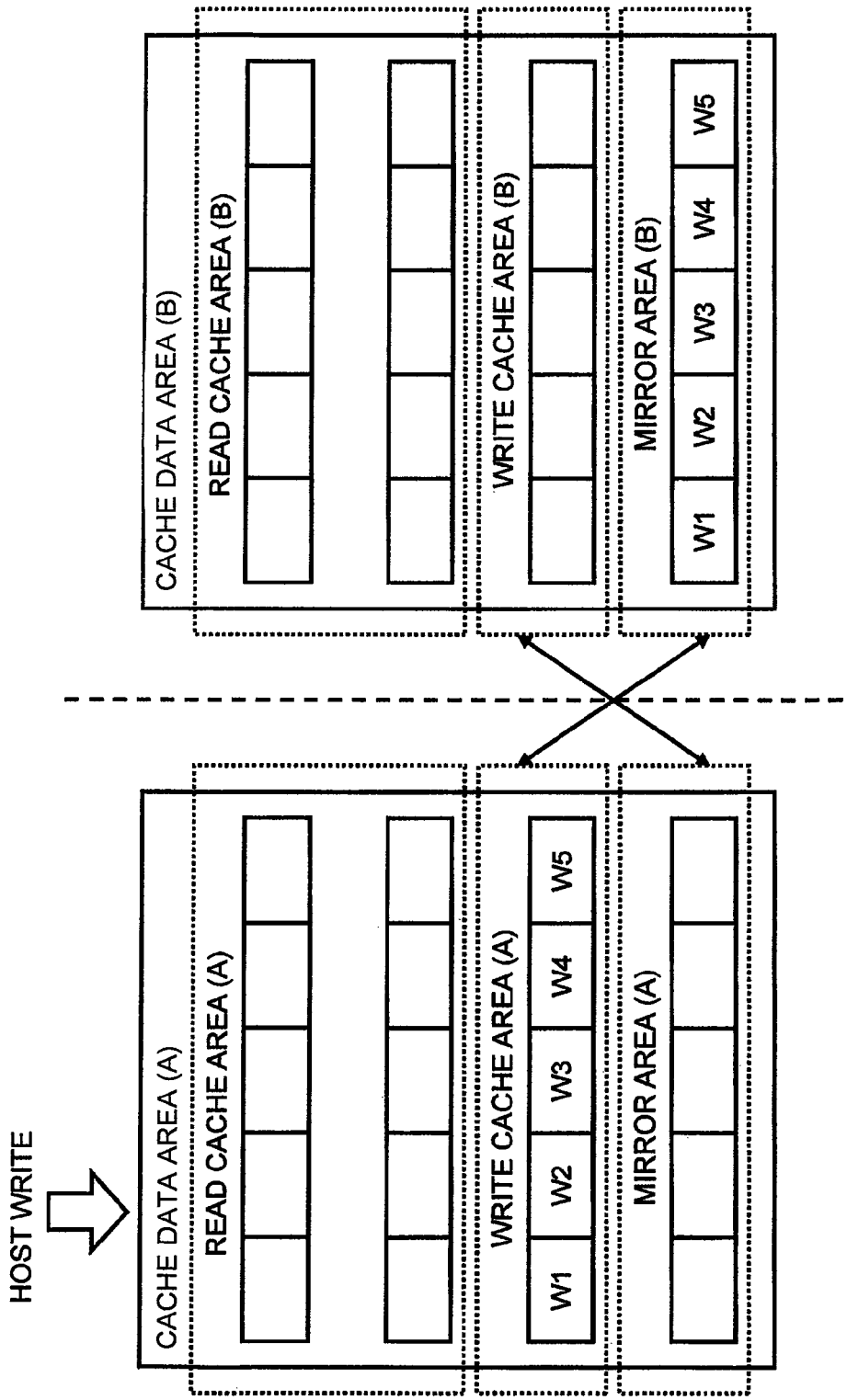

STORAGE SYSTEM WITH MULTIPLE CONTROLLERS AND MULTIPLE PROCESSING PATHS

TECHNICAL FIELD

The present invention generally relates to a storage system with multiple controllers.

BACKGROUND ART

In recent years the market has demanded storage systems with low cost, high performance, and high function. Storage systems can normally be broadly divided into a controller and a group of physical storage devices, and one way to obtain high performance and high function from a storage system is to make the controller have high performance and high function. Specifically, the method of increasing the frequency of the processor to increase the performance of the LSI (large scale integration) that transmits data within the controller, and so on, can be considered.

However, if the controller has high performance and high function, normally the cost of the storage system itself is increased. Therefore, instead of making the controller high performance and high function, it is considered that it is necessary to make the processes within the storage system more efficient.

Technology for making the processes within the storage system more efficient is disclosed in, for example, Patent Literatures 1 and 2. According to Patent Literature 1, a first type of path suitable for high response and a second type of path suitable for high throughput are provided between a first controller and a second controller, and these two types of paths are used accordingly. According to Patent Literature 2, when from among a first type of resource and a second type of resource, the load on one type of resource is high and the load on the other type of resource is within the capacity, processes are executed so that the load on the other type of resource increases.

CITATION LIST

Patent Literature (PTL)

[PTL 1]
Japanese Patent Application Laid-open No. 2001-43026
[PTL 2]
Japanese Patent Application Laid-open No. 2008-186108

Technical Problem

In a storage system having a first and second controller, normally the first controller power supply and the second controller power supply are different, and if a fault occurs on the first controller the second controller starts up instead of the first controller. Therefore while the first controller is operating, the resources of the second controller are not used, so it is not possible to reduce the load on the first controller.

Specifically, for example, it is possible for the first controller to write the data (write data) associated with a write request received from a host device not only to the cache memory (first cache memory) of the first controller, in order that the write data is not lost, but also to the cache memory (second cache memory) of the second controller via the path between the controllers.

However, this is just mirroring the write data, and it does not reduce the load on the first controller.

SUMMARY OF THE INVENTION

It is therefore an object of the present invention to enable the resources of the second controller to be used so that the load on the first controller can be reduced.

Solution to Problem

A first controller, and a second controller coupled to the first controller via a first path are provided. The first controller includes a first relay circuit which is a circuit that controls data transfer, and a first processor coupled to the first relay circuit via a first second path. The second controller includes a second relay circuit which is a circuit that controls data transfer, and which is coupled to the first relay circuit via the first path, and a second processor coupled to the second relay circuit via a second second path. The first processor is coupled to the second relay circuit not via the first relay circuit but via a first third path, and accesses the second relay circuit via the first third path during an I/O process. The second processor is coupled to the first relay circuit not via the second relay circuit but via a second third path, and accesses the first relay circuit via the second third path during an I/O process.

The storage control device may be a storage system including a physical storage device, it may be a device provided with a storage system, or it may be a relay device (for example, a switch device) that relays communication between a host device and a storage system.

The resources of the second controller can be used so that the load on the first controller can be reduced.

BRIEF DESCRIPTION OF DRAWINGS

FIG. 11B shows an example of the cache use when writing for the case where the cache data area is partitioned in a fixed manner.

DETAILED DESCRIPTION OF EMBODIMENTS

The following is an explanation of several embodiments of the present invention with reference to the drawings.

Example 1

Figure 1:
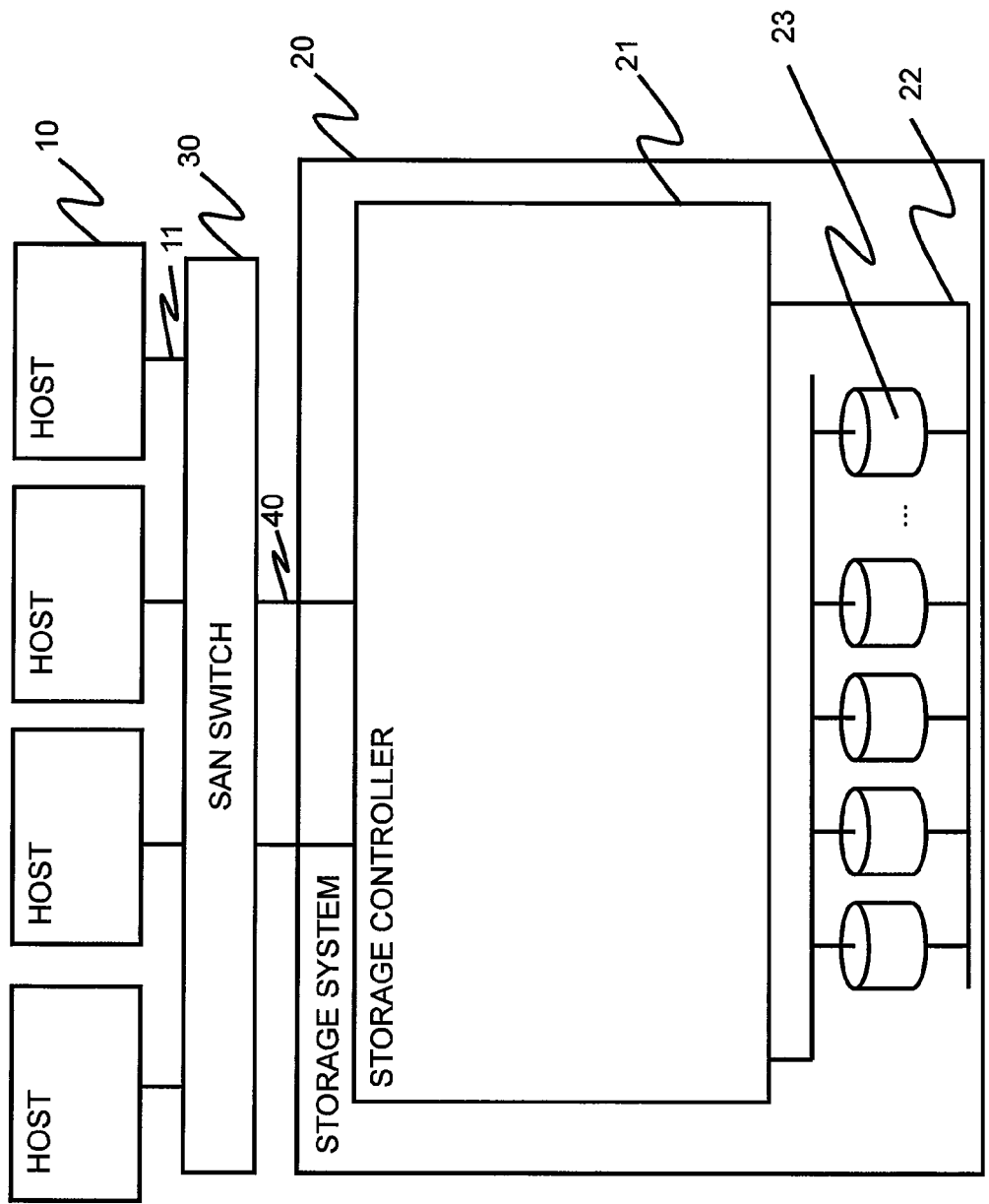
FIG. 1 is a block diagram showing an example of the configuration of a computer system provided with a storage system according to the first embodiment of the present invention.

FIG. 1 is a block diagram showing an example of the configuration of a computer system provided with a storage system according to a first embodiment of the present invention.

The computer system includes a storage system 20, a SAN switch 30, and a plurality of host devices 10. The storage system 20 is connected to the plurality of host devices 10 via the SAN switch 30, which constitutes a SAN (Storage Area Network). For example, the SAN switch 30 is connected to the storage system 20 via a host channel 40, and connected to the plurality of host devices 10 via their respective channels 11.

The storage system 20 includes a storage controller 21 and a plurality of hard disk drives (HDD) 23 as the storage medium. The storage controller 21 is connected to the plurality of HDD 23 via a plurality of hard disk drive channels (HDD channel) 22. The HDD channel 22 may have a redundant configuration. The storage medium may be a solid state drive (SSD) using flash memory or dynamic random access memory (DRAM) or another storage medium, instead of the HDD 23.

The storage controller 21 stores the write data associated with a write request in the HDD 23, in accordance with the write request from the host device 10. The storage controller 21 also reads read data from the HDD 23 in accordance with a read request from the host device 10, and transmits the read data to the host device 10.

Figure 2:
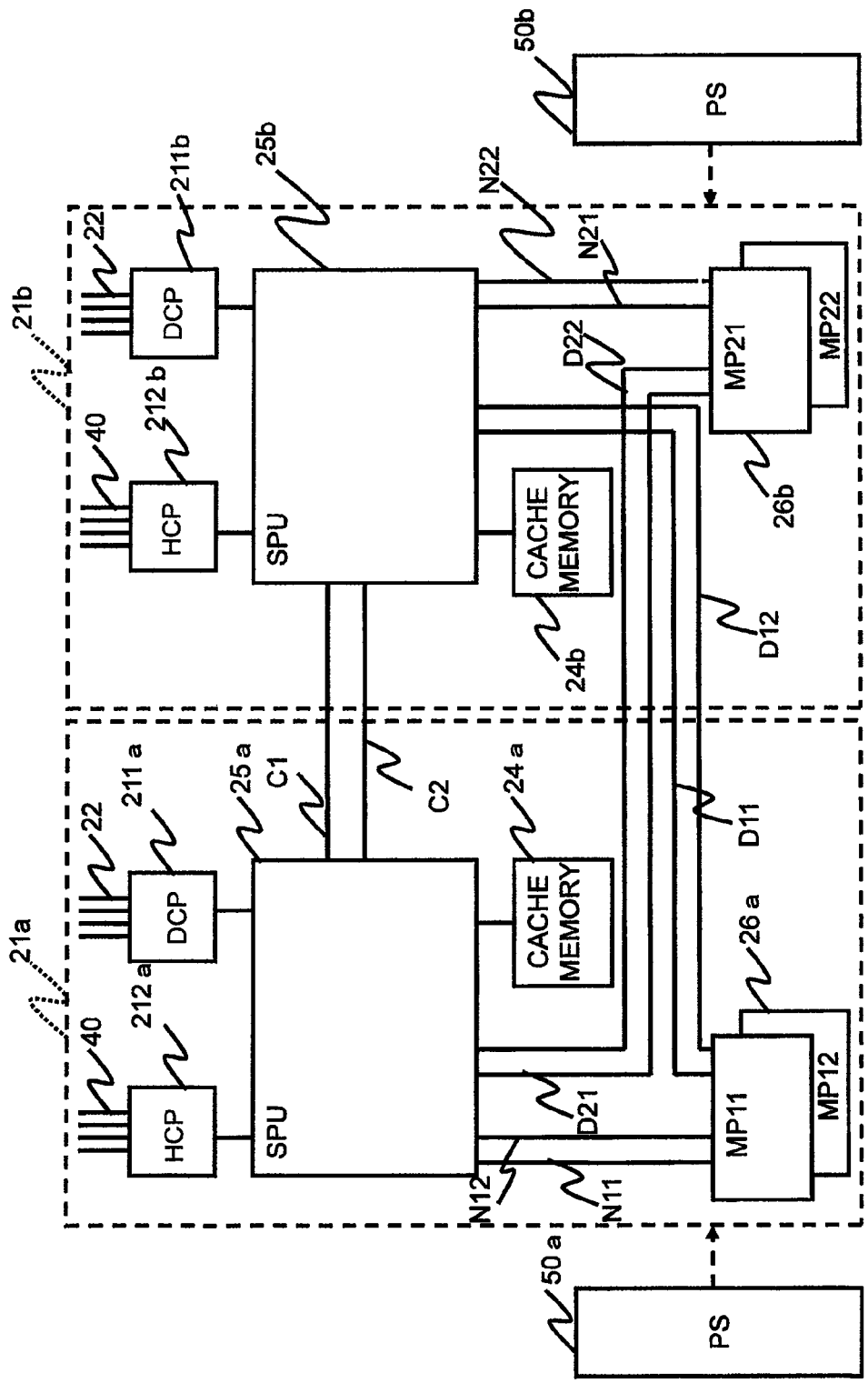
FIG. 2 is a block diagram of the storage controller 21.

FIG. 2 is a block diagram of the storage controller 21.

In the present embodiment, the storage controller 21 has a redundant configuration to provide for faults. For example, as shown in FIG. 2, the storage controller 21 includes two controller units, a first controller unit 21a and a second controller unit 21b. Each controller unit 21a, 21b is indicated by the broken lines. In the example shown in the figure the first controller unit 21a and the second controller unit 21b have the same configuration, but they may have different configurations. In the present embodiment, as explained later, during operation, both the first controller unit 21a and the second controller unit 21b can use not only its own resources within the controller unit, but can also use the resources within the other controller unit, so both the first controller unit 21a and the second controller unit 21b can operate. In other words, it is not necessary that one is on standby while the other is operating, both can operate even though a host device is only connected to one of them.

The first controller unit 21a is supplied with electrical power from a first power supply (PS) 50a, and the second controller unit 21b is supplied with electrical power from a second PS 50b.

The controller unit 21a (21b) includes a storage processing unit (SPU) 25a (25b), a microprocessor (MP) 26a (26b), a host channel protocol unit (HCP) 212a (212b), a disc channel protocol unit (DCP) 211a (211b), and a cache memory 24a (24b).

In the following the first controller unit 21a is taken as an example to explain in detail the controller units 21a and 21b. In the following explanation, for convenience "the first" is applied to the front of the elements of the first controller unit 21a, and "the second" is applied to the front of the elements of the second controller unit 21b.

The first SPU 25a is a hardware circuit, for example a large scale integration (LSI). The first SPU 25a is connected to and controls the first cache memory 24a. The first SPU 25a is connected to the host channel 40 via the first HCP 212a. The first HCP 212a carries out a lower level protocol process of the host channel 40, and converts to a transmission format that can connect to the first SPU 25a. The first SPU 25a is also connected to the HDD channel 22 via the first DCP 211a. The first DCP 211a carries out a lower level protocol process of the HDD channel 22, and converts to a transmission format that can connect to the first SPU 25a.

The first controller unit 21a is connected to the second controller unit 21b. Specifically, the first SPU 25a and the second SPU 25b are connected by two inter-SPU paths C1, C2. The number of inter-SPU paths may be more than two or less than two. The inter-SPU paths C1, C2 are used for access between the cache memories 24a, 24b, and a DMAC which is described later.

In the present embodiment, there is an MP11 and 12 as first MP 26a, and an MP21 and 22 as second MP 26b.

The first MP11 (12) is connected to the first SPU 25a via an SPU-MP path N11 (N12). Likewise, the second MP21 (22) is connected to the second SPU 25b via an SPU-MP path N21 (N22). In the following, the SPU-MP path that connects the MP and SPU within the controller that contains the MP is referred to as the "normal path".

In the present embodiment, SPU-MP paths are provided between controller units as one measure to enable the MP in one controller unit to directly use the resources in the SPU in the other controller unit. In the following, this SPU-MP path is referred to as the "direct path". Specifically, the first SPU 25a is connected to the second MP21 (22) via a direct path D21 (22). Likewise, the second SPU 25b is connected to the first MP11 (12) via a direct path D11 (12).

In other words, according to the present embodiment, the first SPU 25a is connected to the first MP11 (12) via the normal path N11 (N12), and to the second MP21 (22) via the direct path D21 (D22). Likewise, the second SPU 25b is connected to the second MP21 (22) via the normal path N21 (N22), and to the first MP11 (12) via the direct path D11 (D12).

In this configuration, in I/O processes (for example, processes in accordance with a write request, and processes in accordance with read requests), the first MP11 (12) accesses the resources (for example the DMAC, which is described later) within the first SPU 25a or the first cache memory 24a via the normal path N11 (N12), and accesses the resources (for example the DMAC, which is described later) within the second SPU 25b or the second cache memory 24b via the direct path D11 (D12). Also, when a fault is detected on the direct path D11 (D12), the first MP11 (12) can access the resources within the second SPU 25b (for example, the DMAC which is described later) or the second cache memory 24b via the first SPU 25a and the inter-SPU paths C1 or C2.

On the other hand, in I/O processes, the second MP21 (22) accesses the resources (for example the DMAC, which is described later) within the second SPU 25b or the second cache memory 24b via the normal path N21 (N22), and accesses the resources (for example the DMAC, which is described later) within the first SPU 25a or the first cache memory 24a via the direct path D21 (D22). Also, when a fault is detected on the direct path D21 (D22), the second MP21 (22) can access the resources within the first SPU 25a (for example, the DMAC which is described later) or the first cache memory 24a via the second SPU 25b and the inter-SPU paths C1 or C2.

Figure 3:
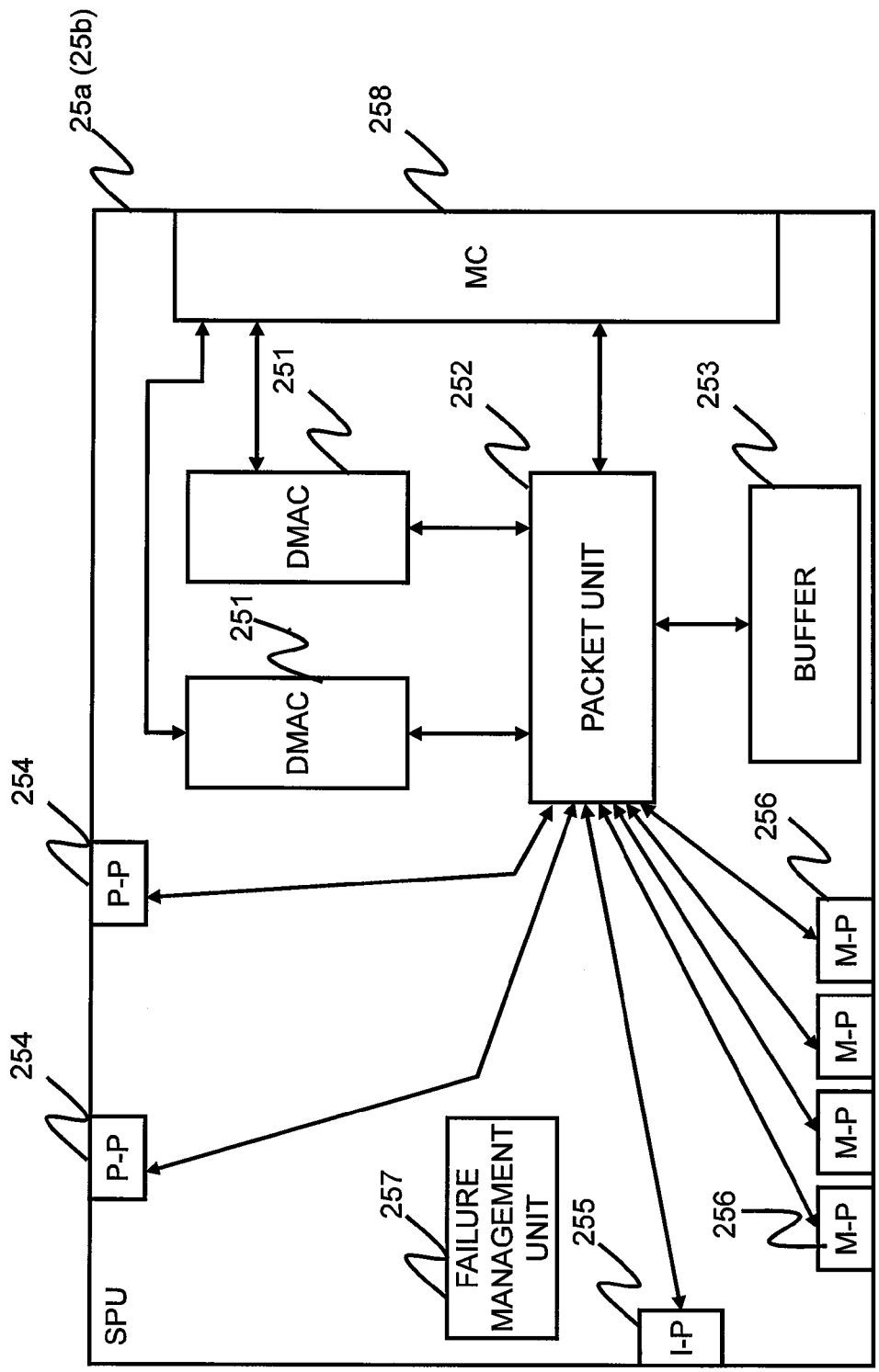
FIG. 3 is a detailed block diagram of the SPU 25*a*.

FIG. 3 is a detailed block diagram of the SPU 25a. The other SPU 25b has a similar configuration.

The SPU 25a includes a DMAC (direct memory access controller) 251 (including two DMACs 251 in the figure), a packet unit 252, a buffer 253, a failure management unit 257, a memory controller (MC) 258, and a plurality of ports. Though a buffer 253 is located within SPU 25a in this embodiment, it may be located on a part of cache memory 24a a memory 263 in MP11(12,21,22).

Each port is either a protocol chip port (P-P) 254, an inter-SPU path port (I-P) 255, or an MP port (M-P) 256. The I-P 255 are ports to which the inter-SPU paths C1, C2 are connected. The M-P 256 are ports to which the normal paths or direct paths are connected. The P-P 254 are ports to which the protocol chips (HCP or DCP) are connected. The MC 258 is a circuit that controls access to the cache memory 24a, 24b.

The packet unit 252 identifies the destination address of data received by the SPU 25a, and transmits packets to an appropriate port or component. When the HCP 212a or DCP 211a receives data from the host device 10 or the HDD 23, the packets containing the received data are stored in the buffer 253 via the packet unit 252 (however packets containing anything except data, such as requests or the like, are transmitted to the MP). Also, when data stored in the buffer 253 is transmitted to the host device 10 or the HDD 23, the packets containing the data that are stored in the buffer 253 are transmitted to the HCP 212a or the DCP 211a via the packet unit 252, and then are transmitted to the host device 10 or the HDD 23 from the HCP 212a or the DCP 211a.

The DMAC 251 controls the transmission of the data stored in the buffer 253 to the cache memory 24a, 24b based on instructions from the MP 26a or 26b depending on the transfer parameter. The DMAC 251 also controls the transmission of data stored in the cache memory 24a, 24b to the buffer 253 based on instructions from the MP 26a or 26b depending on the transfer parameter. The transfer parameter is described later.

The failure management unit 257 is a unit that monitors for the occurrence of faults in each of the resources within the SPU 25 (25a, 25b), in order that each of the resources within the SPU 25 is effectively used. The failure management unit 257 is connected to each resource (component) within the SPU 25. If a fault occurs in one of the resources within the SPU 25, the failure management unit 257 detects the fault, and notifies each MP 26a, 26b of the resource in which the fault has occurred. For example, if a fault occurs in a certain M-P 256, the MP 26a or 26b connected to the M-P 256 in which the fault has occurred cannot access the resources (for example the DMAC 251) within the SPU 25a via the normal path or the direct path. Therefore the failure management unit 257 gets the MP 26a or 26b connected to the M-P 256 in which a fault has not occurred to take over the process carried out by the MP 26a or 26b connected to the M-P 256 in which the fault has occurred.

Figure 4:
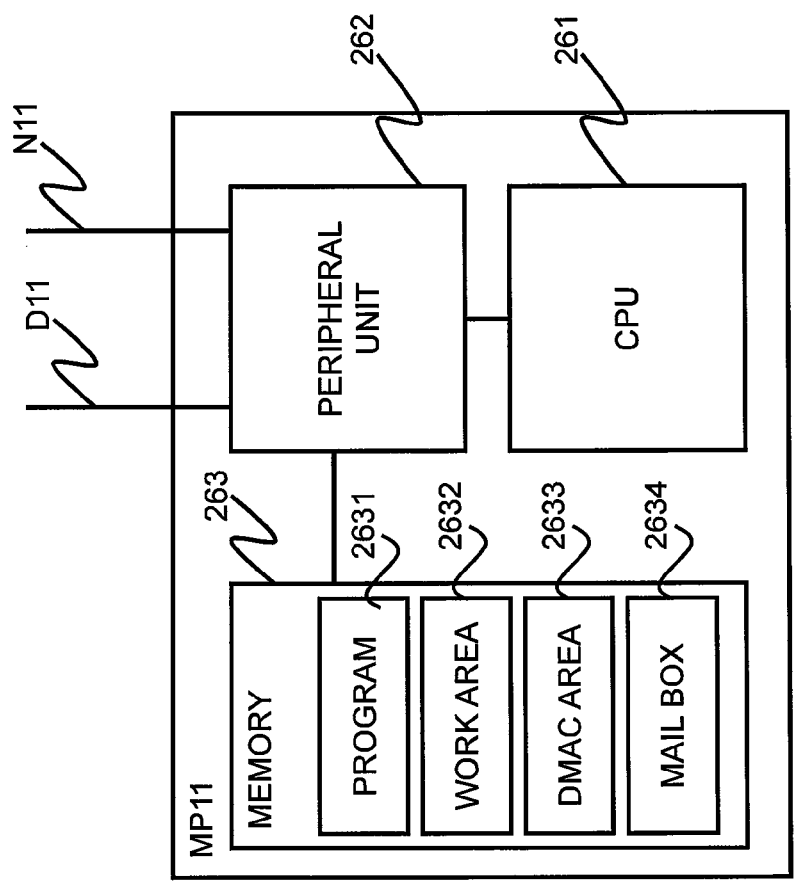
FIG. 4 is a detailed block diagram of the MP11.

FIG. 4 is a detailed block diagram of the MP11. The other MPs 12, 21, and 22 each have the same configuration. The MP11 includes a CPU 261, a peripheral unit 262, and a memory 263.

The CPU 261 reads programs from the memory 263, and carries out processes based on the program by executing the program.

The peripheral unit 262 is an interface circuit connected to the CPU 261 and the memory 263. The normal path N11 connected to the SPU 25a and the direct path D11 connected to the SPU 25b are connected to the peripheral unit 262. The peripheral unit 262 controls communication between the CPU 261 and the memory 263, and communication between the CPU 261 and the SPU 25a or 25b via the normal path N11 or the direct path D11. In some types of CPU 261, the peripheral unit 262 may be integrated with CPU 261.

The memory 263 is accessed from the CPU 261 (and also from the SPU 25a or 25b). The memory 263 includes a program area 2631, a work area 2632, a DMAC area 2633, and a mail box 2634.

Programs that are executed by the CPU 261 are stored in the program area 263. The work area 2632 is a work area provided for the CPU 261 to execute programs. The transmission status from the DMAC 251 is stored in the DMAC area 2633. The mail box 2634 is used for communication with other MPs 12, 21, or 22.

Figure 5:
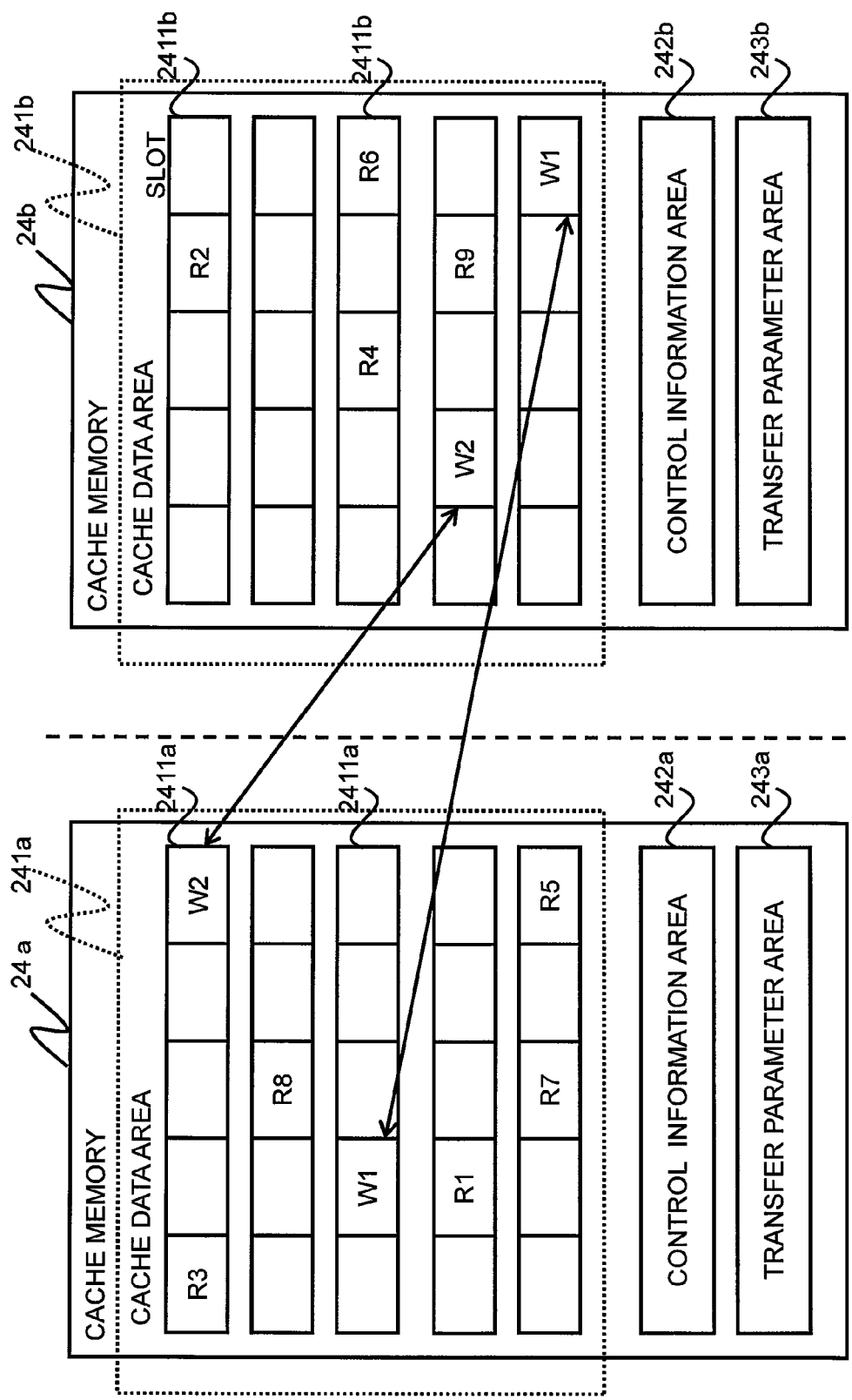
FIG. 5 is a block diagram showing the data area within the cache memories 24*a* and 25*b*.

FIG. 5 is a block diagram showing the data area within the cache memories 24a and 24b.

The cache memory 24a (24b) includes a control information area 242a (242b), a transfer parameter area 243a (243b), and a cache data area 241a (241b).

The control information area 242a (242b) stores control information. The control information includes, for example, the following information (1) to (5):

(1) Directory information specified by a slot 2411a (2411b) that stores data;

(2) Information indicating the status of use of slots 2411a (2411b);

(3) Data storage information indicating what data is stored in what slot 2411a (2411b), for slots 2411a (2411b) that are being used;

(4) RAID control setting information for a plurality of HDD 23 provided as a virtual single volume; and (5) Information regarding functions such as the backup function, the snap shot function, and the remote copy function.

The transfer parameter area 243a (243b) stores transfer parameters set by the MP 26a or 26b. The transfer parameters stored in the transfer parameter area 243 are fetched by the DMAC 251 and executed. Transfer parameters are described later.

In the present embodiment, the transfer parameter area 243a (243b) is provided in the cache memory 24a (24b). However, the transfer parameter area 243a and/or 243b may, for example, be provided in another storage resource, for example the buffer 253 and/or the memory 263 (memory resource within the MP 26a (26b)). If the memory 263 has the transfer parameter area 243a (243b), the transfer parameter area 243a (243b) is provided in, for example, the DMAC area 2633.

The cache data area 241a (241b) has a plurality of slots 2411a (2411b). Write data or read data is temporarily stored in the slots 2411a (2411b) in accordance with write commands from the host device 10. In the figure the write data is represented by a combination of the alphabetic character "W" and a number. The read data is represented by a combination of the alphabetic character "R" and a number.

The cache data area 241a (241b) is provided with a plurality of slots, but is not provided with a fixed plurality of areas such as an area for writing write data or an area for writing read data. Therefore, write data (W) and read data (R) are stored in arbitrary slots 2411a (2411b) in the cache data area 241a (241b). In particular, write data (W) is stored in both the cache data areas 241a and 241b. In other words, so-called double writing of data, or in other words, cache mirroring of data is carried out.

Figure 9:
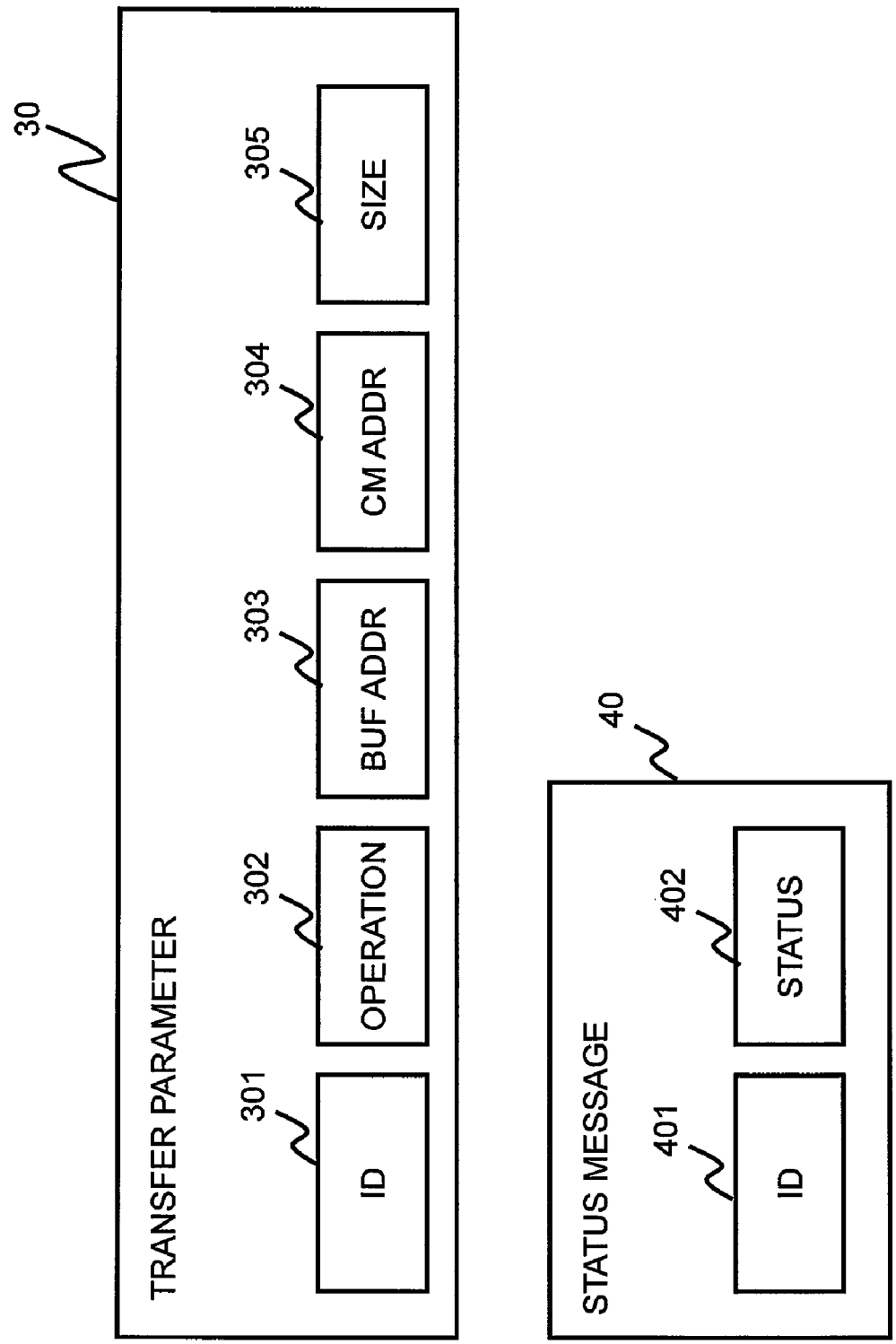
FIG. 9 shows details of a transfer parameter 30 and a status message 40.

FIG. 9 shows details of a transfer parameter 30 and a status message 40.

First, the transfer parameter 30 is explained below.

The transfer parameter 30 is a parameter relating to data transfer. The transfer parameter 30 includes an ID field 301, an operation field 302, a buffer address (BUF ADDR) field 303, a cache memory address (CM ADDR) field 304, and a size field 305.

The ID field 301 is an area in which an ID applied to the MP 26a (26b) is set.

The operation field 302 is an area in which information representing the operation type is set. Operation types include, for example, "read" in which data is transferred from the cache memory 24a (or 24b), "write" in which data is transferred to a single cache memory 24a (or 24b), and "double write" in which data is transferred to both cache memories 24a and 24b.

The buffer address field 303 is an area in which a value representing the address of the buffer 253 (the buffer address value) is set.

The cache address field 304 is an area in which a value representing the address of the cache memory 24a and/or 24b (the cache address value) is set. The cache memory value may include, for example, information to identify the cache memory 24a and/or 24b, or slot 2411 (2411a and/or 2411b) location information. When the operation type is "double write", the cache address values for both the cache memories 24a and 24b are set in the address field 304.

The size field 305 is a field in which information (data size information) representing the size of data to be transmitted (data length) is set.

The storage controller 21 may be provided with a scatter function in which, when writing, continuous write data in the buffer 253 is divided and stored among a plurality of cache memories 24, and a gather function in which, when reading, read data that is divided among a plurality of cache memories 24 is stored continuously in a single buffer. When this scatter function or gather function is used, a plurality of cache address fields 304 and size fields 305 is combined in the transfer parameter 30.

Next, the status message 40 is explained as follows.

The status message 40 is a message corresponding to the transfer parameter 30, and represents the status of the result of execution of the transfer parameter 30. The status message 40 includes an ID field 401, and a status field 402.

The ID field 401 is an area in which an ID that is the same as the ID set in the corresponding transfer parameter 30 is set. Therefore, using the ID in the ID field 401, it is possible to identify the transfer parameter 30 corresponding to the status message 40 having this ID.

The status field 402 is an area in which information representing the status of execution of the transfer parameter 30 is set. The status can include, for example, "completed normally", "cache memory fault detected during transfer", "path fault detected during transfer", and "improper transfer parameter format".

The status message 40 is a message transferred to the MP 26a, 26b when it is detected by the DMAC 251 that execution of the transfer parameter 30 is completed. The MP 26a, 26b can know the transfer status by receiving the status message 40.

In other words, the MP 26a, 26b count the transfer parameters 30 corresponding to status messages 40 that have not been received, whereby it is possible to know the number of transfer parameters 30 that have not been completed. For example, if the load on the DMAC 251 is high, the result will be that the speed of processing transfer parameters 30 will become slow. Specifically, if for example the frequency of issuing transfer parameters 30 is higher than the frequency of executing transfer parameters 30, the number of incomplete transfer parameters 30 will increase. In other words, by knowing the number of incomplete transfer parameters 30, it is possible to know the load status of the DMAC 251 without each MP 26a, 26b communicating with the other MP 26a, 26b.

Figure 8:
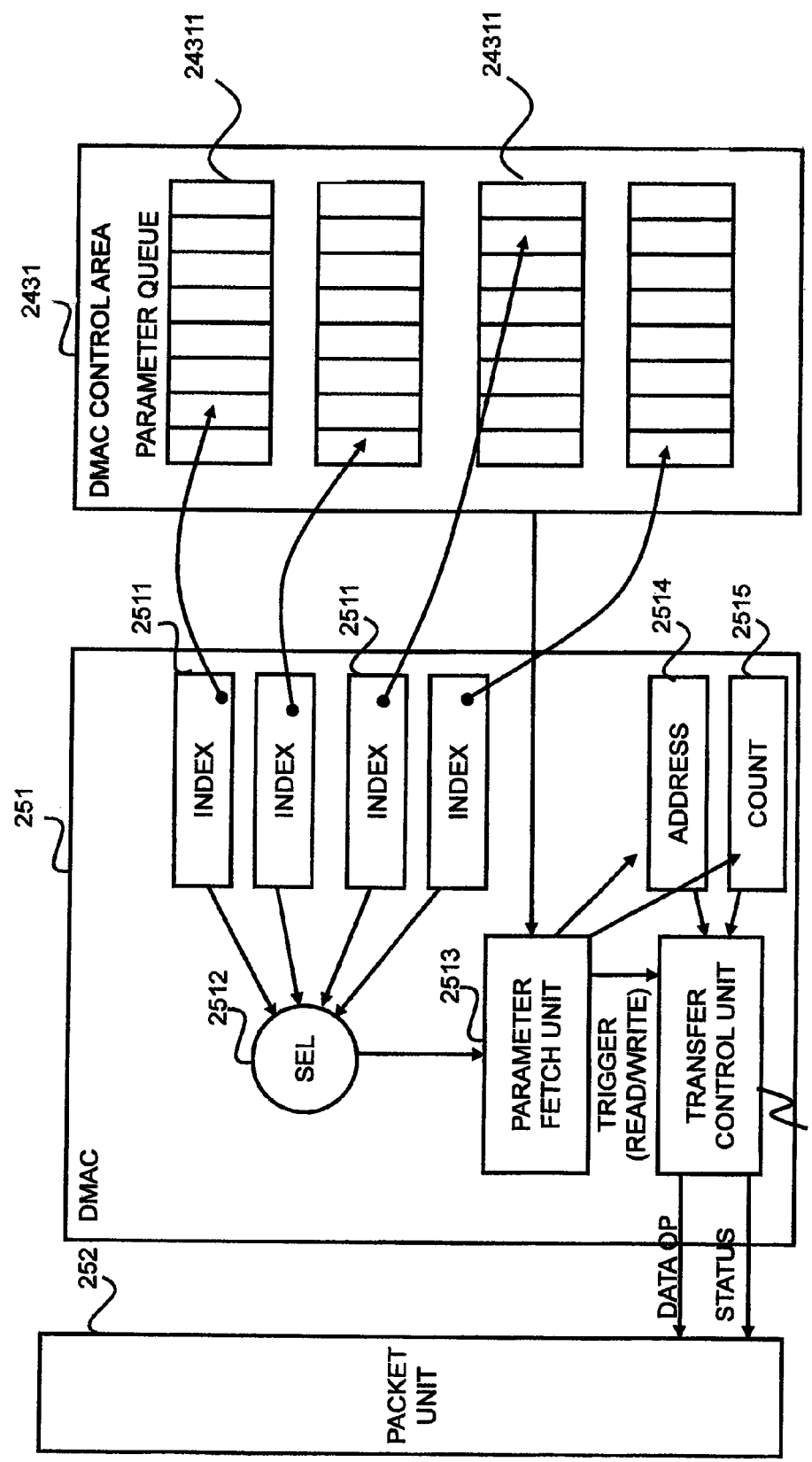
FIG. 8 is a block diagram showing the structure of the interior of the DMAC 251 and the relationship between the DMAC 251, the packet unit 252, and a DMAC control area 2431.

FIG. 8 is a block diagram showing the internal structure of the DMAC 251, and the relationship between the DMAC 251 and the packet unit 252 and a DMAC control area 2431. In the following explanation, it is assumed that the DMAC 251 and the packet unit 252 shown in FIG. 8 are elements within the SPU 25a.

First, the internal structure of the DMAC control area 2431 is explained.

The DMAC control area 2431 is an area provided within the transfer parameter area 243a in the cache memory 24a. The DMAC control area 2431 includes a plurality of parameter queues 24311. The plurality of parameter queues 24311 within the DMAC control area 2431 correspond one for one to the MP within the storage controller 21. In other words, each DMAC 251 is provided with a parameter queue 24311 for each MP. Each parameter queue 24311 has the ID of the corresponding MP (corresponding MP-ID).

Next, the internal structure of the DMAC 251 is explained.

The DMAC 251 includes indexes 2511, a selector (SEL) 2512, a parameter fetch unit 2513, an address register 2514, a count register 2515, and a transfer control unit 2516.

The indexes 2511 are provided corresponding one to one to the MP within the storage controller 21, the same as for the parameter queues 24311 of the DMAC 251. In other words, the DMAC 251 is provided with an index 2511 for each MP, and each index 2511 corresponds to each parameter queue 24311. Each index 2511 has, for example, the ID of the corresponding MP (corresponding MP-ID). In other words, the ID of the MP 26a, 26b is the corresponding MP-ID applied to each of the parameter queues 24311, as well as the corresponding MP-ID applied to each of the indexes 2511.

Transfer parameters 30 from the MP 26a or 26b are stored in the parameter queue 24311 corresponding to the MP 26a or 26b. The transfer parameter 30 stored first is first fetched by the parameter fetch unit 2513 from the parameter queue 24311. In other words, unprocessed transfer parameters 30 in the parameter queue 24311 are processed in the order that they were stored.

The number of incomplete transfer parameters 30 in a parameter queue 24311 (in other words, the number of parameter queues 30 accumulated in the queue 24311) is recorded in the index 2511 corresponding to the parameter queue 24311. For example, if one transfer parameter 30 is stored by an MP 26a or 26b in a parameter queue 24311 corresponding to the MP, the value stored in the index 2511 corresponding to the MP will be incremented by 1. Also, if one transfer parameter 30 is fetched from the parameter queue 24311 by the parameter fetch unit 2513, the value stored in the index 2511 corresponding to the parameter queue 24311 will be decremented by 1.

The selector 2512 selects an index 2511 that has been incremented (hereafter referred to as the target index), and the ID corresponding to the selected target index is sent to the parameter fetch unit 2513. Selection of the target index by the selector 2512 is carried out when, for example, the parameter fetch unit 2513 is in the usable state (the "READY" state). If there is a plurality of target indexes, the selector 2512 selects a single target index in accordance with a specific rule (for example, round robin).

The parameter fetch unit 2513 fetches the transfer parameter 30 from the target index 2511 to which the ID received from the selector 2512 corresponds. The parameter fetch unit 2513 sets the buffer address value and the cache address value in the fetched transfer parameter 30 in the address register 2514, and sets the data size value in the transfer parameter 30 in the count register 2515. Also, when the transfer control unit 2516 is in the ready state, the parameter fetch unit 2513 sends the operation type and the received corresponding ID of the transfer parameter 30 to the transfer control unit 2516, and initiates the transfer start trigger corresponding to the operation type. Triggers can include read triggers and write triggers.

When the transfer control unit 2516 receives the transfer start trigger from the parameter fetch unit 2513, it controls transfer between the cache memory and the buffer.

For example, if a read trigger is initiated, the transfer control unit 2516 transfers the data (read data) stored in the slot represented by the cache memory value set in the register 2514 from that slot to the buffer area (area within the buffer 253) represented by the buffer address value set in the register 2514. Also, if a write trigger is initiated, the transfer control unit 2516 transfers the data (write data) stored in the buffer area represented by the buffer address value set in the register 2514 from that buffer area to the slot represented by the cache memory value set in the register 2514. Every time data transfer is carried out, the value of the size of the transferred data is deducted from the data size value stored in the register 2515 by the transfer control unit 2516. In other words, this data transfer is repeated until the amount of data transferred is the value of the data size stored in the register 2515. When data transfer amounting to the value of the data size stored in the register 2515 has been completed (for example when the data size value stored in the register 2515 is zero), the transfer control unit 2516 generates a status message 40 corresponding to the processed transfer parameter 30, and sends the status message 40 to the MP. Specifically, the transfer control unit 2516 creates a status message 40 containing the corresponding ID received from the parameter fetch unit 2513, and sends the message 40 to the MP having that corresponding ID. This data transfer has the following three patterns:

(P1) A pattern in which the transfer source storage area is within a controller unit having the DMAC 251 shown in the figure, and the transfer destination storage area is within a controller unit having the DMAC 251 shown in the figure, so data is not transferred between SPUs;

(P2) A pattern in which the transfer source storage area is within a controller unit having the DMAC 251 shown in the figure, and the transfer destination storage area is within a controller unit that is separate from the controller unit having the DMAC 251 shown in the figure;

(P3) A pattern in which the transfer source storage area is within a controller unit that is separate from a controller unit having the DMAC 251 shown in the figure, and the transfer destination storage area is within a controller unit having the DMAC 251 shown in the figure.

One of the transfer source and transfer destination storage areas is a slot within the cache data area 241a or 241b, and the other storage area is the buffer area (or another storage resource such as memory within the MP).

The following is an explanation of the flow of the process carried out by the present embodiment.

Figure 6:
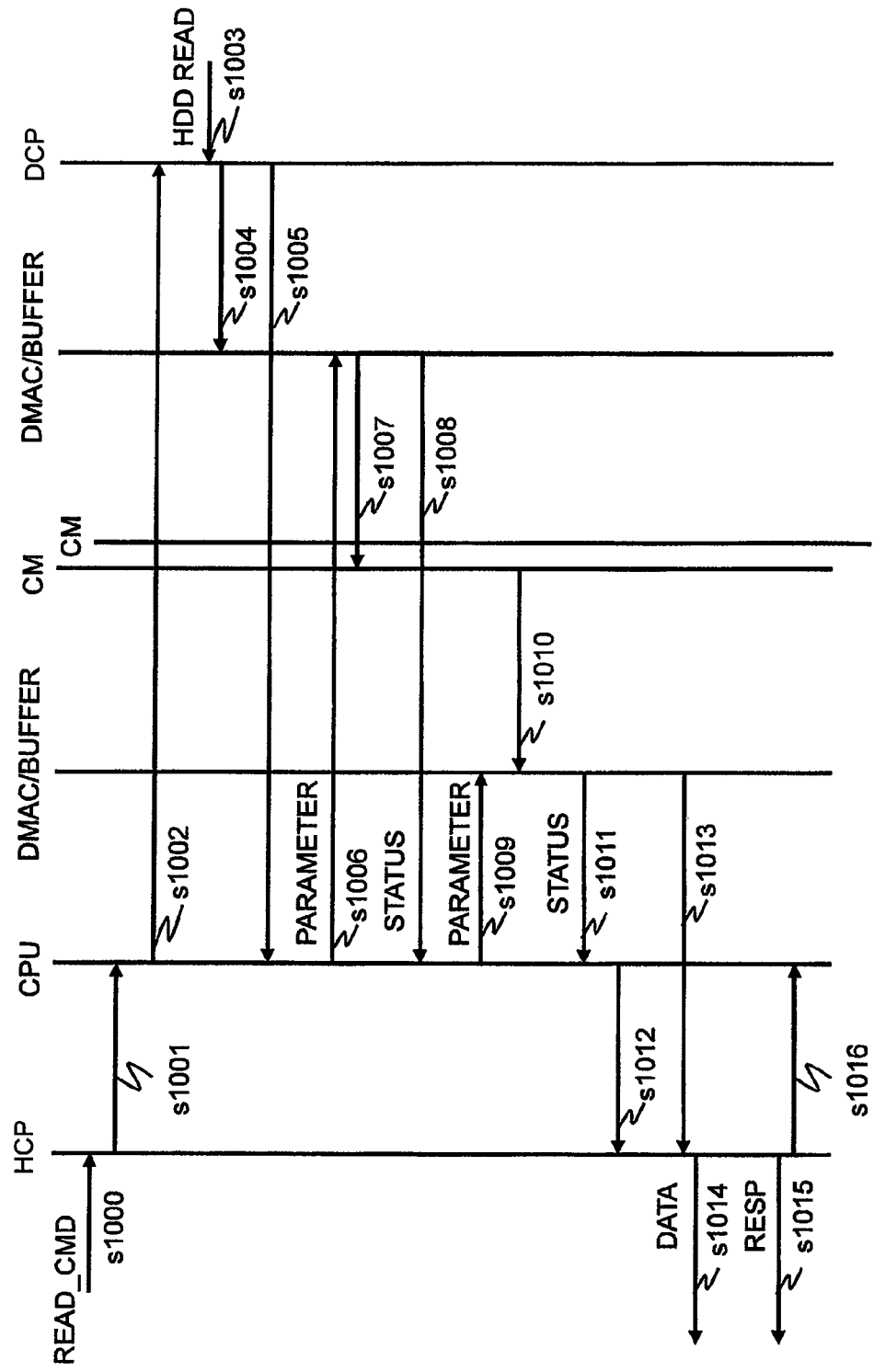
FIG. 6 is a ladder chart showing the flow of the process (the read process of the I/O processes) when a read request is received by the storage system 20 from the host device 10.

FIG. 6 is a ladder chart showing the flow of the process (the read process of the I/O processes) in the case where the storage system 20 receives a read request from the host device 10. In the following explanation, it is assumed that the HCP 212a has received the read request. Also, to make it easy to distinguish what element is in what controller unit in the explanations of FIG. 6 and FIG. 7, "a" is applied to the end of the reference numeral of elements within the first controller unit 21a, and "b" is applied to the end of the reference numeral of elements within the second controller unit 21b.

The HCP 212a receives a read request from the host device 10 (s1000). In the following, the data in accordance with this read request is referred to as "the read data".

The HCP 212a sends the read request received from the host device 10 to the mail box 2634a of the MP 26a (s1001).

The CPU 261a that has confirmed the read request in the mail box 2634a refers to the control information within the control information areas 242a and 242b, and determines whether there has been a cache hit or not. Whether there has been a cache hit or not means whether or not there is data stored in the locations specified by the physical address (for example, the logical unit number (LUN)) and the logical block address (LBA) specified in an I/O request from the host device. If there has been a cache hit (here, if the correspondence between the physical address specified by the read request and the slots 2411a or 2411b is controlled), the procedure moves to S1009.

On the other hand, if there has not been a cache hit, the CPU 261a specifies the DCP 211a to transfer the read data to the buffer 253a (or to another storage resource such as the memory 263a) (s1002). On this occasion, the CPU 261a notifies, for example, the DCP 211a of the specified physical address based on the physical address specified in the read request.

The DCP 211a accesses the HDD 23 (for example, the notified physical address) and receives the read data (s1003).

At s1004, the DCP 211a stores the received read data in the buffer 253a (or another storage resource, such as the memory 263a). Then, the CPU 261a secures arbitrary slots 2411a or 2411b from among the plurality of slots that can be secured in the cache memory 24a and 24b. Slots that can be secured are slots that are controlled as free or clean slots. A free slot is an empty slot. A clean slot is a slot in which data that has been stored on the HDD 23 is stored. In the explanation of FIG. 6, it is assumed that the slot 2411b has been secured from the cache memory 24b.

The DCP 211a transmits a completion notification to the CPU 261a notifying it that storage of the read data to the buffer 253a has been completed (s1005).

At s1006, the following control (s1006-1) to (s1006-4) is carried out.

(s1006-1) After receiving the completion notification, the CPU 261a carries out the DMAC selection process. In other words, the CPU 261a selects one DMAC 251a or 251b from among the plurality of DMACs 251a and 251b in the SPU 25a and 25b. In the DMAC selection process, as described later, a DMAC within the controller unit having the storage area of the transfer destination of the data is selected in priority to a DMAC in a controller unit that does not have the storage area of the transfer destination of the data. Therefore, here it is assumed that a DMAC 251b is selected.

(s1006-2) The CPU 261a creates a transfer parameter containing the following (R01) to (R05):

(R01) ID:
(R02) Operation type "write" (to write data to the cache memory),
(R03) Address value of the secured slot,
(R04) Address value of the buffer area where the read data is stored;
(R05) Data size value of the read data.

(s1006-3) The CPU 261a sets the transfer parameter 30 in the parameter queue 24311b corresponding to the MP 26a that has the CPU 261a, from among the plurality of parameter queues 24311b of the DMAC 251b selected in s1006-1.

(s1006-4) The CPU 261a starts up the above selected DMAC 251b.

The started up DMAC 251b fetches the transfer parameter 30 from the parameter queue 24311b within the DMAC control area 2431b, and based on the transfer parameter 30, transfers the read data from the transfer source buffer 253a to the transfer destination slot 2411b (s1007).

After the read data is stored in the slot 2411b, the DMAC 251b sends a status message 40 indicating completion of the transfer to the DMAC area 2633a within the MP 26a, via for example the direct path D11 or D12 (s1008).

Step S1009 is executed when the CPU 261a confirms the status message 40 stored in the DMAC area 2633a in step S1008, or, when in step S1002 there was a cache hit. In step s1009, the following process (s1009-1) to (s1009-4) is carried out.

(s1009-1) The CPU 261a carries out the DMAC selection process. Here it is assumed, for example, that a DMAC 251a is selected.

(s1009-2) The CPU 261a creates a transfer parameter 30 containing the following (R11) to (R15):
(R11) ID;
(R12) Operation type "read" (for reading data from the cache memory),
(R13) The address value of the slot 2411b where the read data is stored,
(R14) Address value of the buffer area;
(R15) Data size value of the read data.

(s1009-3) The CPU 261a sets the transfer parameter 30 in the parameter queue 24311a corresponding to the MP 26a of the CPU 261a, from among the plurality of parameter queues 24311a of the DMAC 251a.

(s1009-4) The CPU 261a starts up the above selected DMAC 251a.

The started up DMAC 251a fetches the transfer parameter 30 from the parameter queue 24311a within the DMAC control area 2431a, and based on the transfer parameter 30, transfers the read data from the slot 2411b to the buffer area (s1010).

After completion of transfer, the DMAC 251a sends a status message 40 indicating completion of the transfer to the DMAC area 2633a within the MP 26a (s1011).

After confirming the status message 40 stored in the DMAC area 2633a in step s1011, the CPU 261a instructs the HCP 212a to transfer the read data stored in the buffer area 253a to the host device 10 (s1012).

After receiving the instruction, the HCP 212a reads the read data from the buffer area 253a (s1013).

The HCP 212a transfers the read data read from the buffer 253a to the host device 10 (s1014).

When transfer of all the read data has been completed normally, the HCP 212a gives a response to that effect (normal completion) to the host device 10 (s1015).

Further, the HCP 212a notifies the MP 26a that it has responded to the host device 10 (s1016). In this way, the MP 26a recognizes that processing of the read request has been completed.

Figure 7:
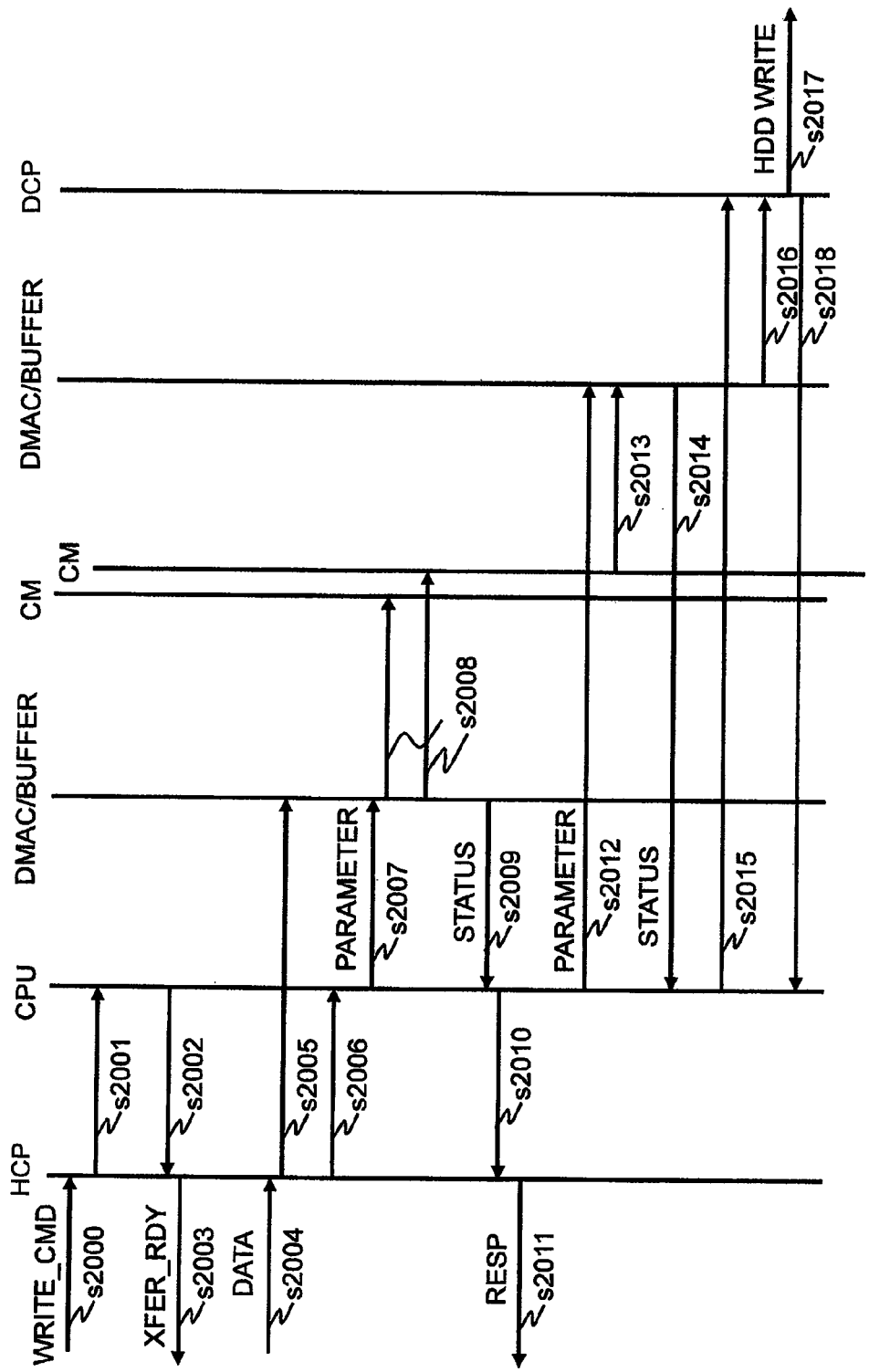
FIG. 7 is a ladder chart showing the flow of the process (the write process of the I/O processes) when a write request is received by the storage controller 21 from the host device 10.

FIG. 7 is a ladder chart showing the flow of the process (the write process from among the I/O processes) for the case where the storage controller 21 receives a write request from the host device 10. In the following explanation, it is assumed that the HCP 212a receives the write request.

The HCP 212a receives the write request from the host device 10 (s2000). In the following, the data in accordance with the write request is referred to as "the write data".

The HCP 212a sends the write request received from the host device 10 to the mail box 2634a of the MP 26a (s2001).

The CPU 261a that has confirmed the write request in the mail box 2634a refers to the control information within the control information areas 242a and 242b, and determines whether there has been a cache hit or not.

Here, the write data is data that is to be stored in both the cache memory 24a and 24b, in other words, it is data that is to be double written.

Therefore, determining a cache hit is determining whether or not there are slots 2411a and 2411b corresponding to the physical address specified in the write request. If there is a cache hit, the corresponding slots 2411a and 2411b are secured. If there is not a cache hit, the CPU 261a secures slots 2411a and 2411b from the cache data areas 241a and 241b.

When the slots 2411a and 2411b have been secured, the CPU 261a instructs the HCP 212a to convey to the host device 10 that receiving preparations for the write data have been completed (s2002).

After receiving the instruction from the CPU 261a, the HCP 212a sends a message indicating that receiving preparations for the write data have been completed to the host device 10 (s2003).

The host device 10 sends the write data to the HCP 212a (s2004).

After receiving the write data, the HCP 212a stores the write data in the buffer 253a (s2005).

After storing the write data in the buffer 253a, the HCP 212a sends the CPU 261a a completion notification to inform it that storage of the write data in the buffer 253a has been completed (s2006).

In s2007, the following steps (s2007-1) to (s2007-4) are executed.

(s2007-1) After receiving the completion notification, the CPU 261a carries out the DMAC selection process. Here it is assumed that a DMAC 251a is selected.

(s2007-2) The CPU 261a creates a transfer parameter 30 containing the following (W01) to (W05):
(W01) ID;
(W02) Operation type "double write" (to transfer the data to the data cache memory in accordance with the write request),
(W03) Address value of the secured slots 2411a and 2411b,
(W04) Address value of the buffer area where the write data is stored;
(W05) Data size value of the write data.

(s2007-3) The CPU 261a sets the transfer parameter 30 in the parameter queue 24311a corresponding to the MP 26a that has the CPU 261a, from among the plurality of parameter queues 24311a of the DMAC 251a selected in s6000.

(s2007-4) The CPU 261a starts up the above selected DMAC 251a.

The started up DMAC 251a fetches the transfer parameter 30 from the parameter queue 24311a within the DMAC control area 2431*a*, and based on the transfer parameter 30, transfers the write data from the buffer 253*a* to the slots 2411*a* and 2411*b* (s2008).

After both data transfers have been completed, the DMAC 251*a* sends a status message 40 indicating completion of the transfer to the DMAC area 2633*a* of the MP 26*a* (s2009).

After step S2009, after confirming the status message 40 stored in the DMAC area 2633*a*, the CPU 261*a* notifies the HCP 212*a* that writing has been completed (s2010).

After receiving the notification that writing has been completed, the HCP 212*a* responds to the host device 10 that writing has been completed (s2011).

Then, in s2012, the following processes (s2012-1) to (s2012-4) are carried out.

(s2012-1) The CPU 261*a* selects one of the slots 2411*a* and 2411*b* where the write data is stored. Here it is assumed that the slot 2411*a* is selected.

(s2012-2) The CPU 261*a* carries out the DMAC selection process. Here it is assumed that a DMAC 251*a* is selected.

(s2012-3) The CPU 261*a* creates a transfer parameter containing the following (W11) to (W15):
(W11) ID;
(W12) Operation type "read" (to read data from the cache memory),
(W13) Address value of the slot 2411*a* where the write data is stored,
(W14) Address value of the buffer area;
(W15) Data size value of the write data.

(s2012-4) The CPU 261*a* sets the transfer parameter 30 in the parameter queue 24311*a* corresponding to the MP 26*a* that has the CPU 261*a*, from among the plurality of parameter queues 24311*a* of the DMAC 251*a*.

(s2012-5) The CPU 261*a* starts up the above selected DMAC 251*a*.

The started up DMAC 251*a* fetches the transfer parameter 30 from the parameter queue 24311*a* within the DMAC control area 2431*a*, and based on the transfer parameter 30, transfers the write data from the slot 2411*a* to the buffer area (s2013).

After transfer has been completed, the DMAC 251*a* sends a status message 40 indicating completion of the transfer to the DMAC area 2633*a* of the MP 26*a* (s2014).

After step s2014, after confirming the status message 40 stored in the DMAC area 2633*a*, the CPU 261*a* instructs the DCP 211*a* to transfer the write data stored in the buffer area to the HDD 23 (s2015).

After receiving the instruction from the CPU 261*a*, the DCP 211*a* reads the write data from the buffer area (s2016).

The DCP 211*a* stores the write data on the HDD 23 (s2017).

When all the data transfer has been completed normally, the DCP 211*a* sends a completion notification to that effect to the CPU 261*a* (s2018).

After receiving the completion notification, the CPU 261*a* releases the slot 2411*a* where the write data was stored. The released slot 2411*a* is controlled as a clean slot.

Figure 10:
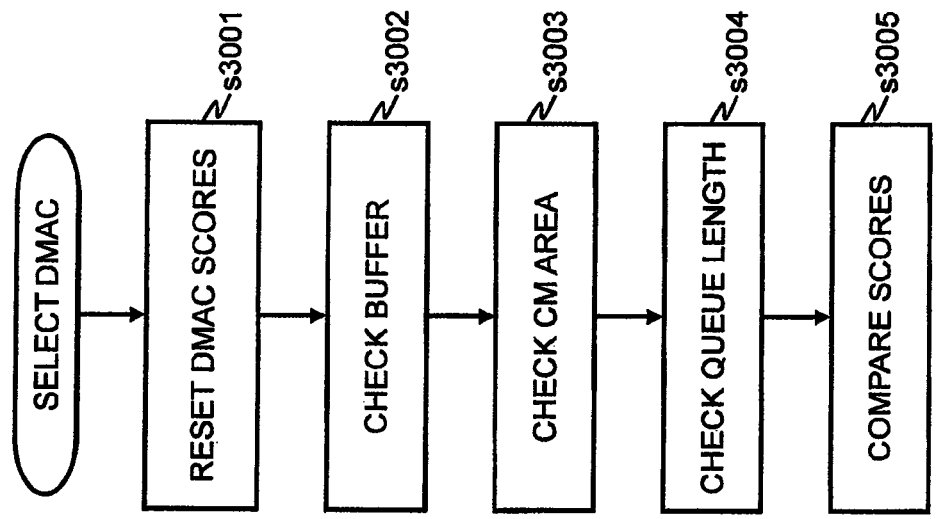
FIG. 10 is a flowchart of the DMAC selection process.

FIG. 10 is a flowchart of the DMAC selection process. In the following explanation, the MPs 26*a* and 26*b* are referred to collectively as "the MP 26".

In s3001, the MP 26 resets a DMAC score for each DMAC 251.

In s3002, the MP 26 changes the DMAC score in accordance with the location of the transfer destination (or transfer source) buffer 253. Specifically, the MP 26*a* does not change the DMAC score of the DMAC 251 within the SPU 25 that includes the transfer destination buffer 253, and adds a first predetermined value to the DMAC score of the DMAC 251 within the SPU 25 that does not include the transfer destination buffer 253.

In s3003, the MP 26 changes the DMAC score in accordance with the location of the transfer destination (or transfer source) cache memory. Specifically, for example the MP 26 does not change the DMAC score of the DMAC 251 within the SPU 25 that is connected to the transfer destination cache memory, and adds a second predetermined value to the DMAC score of the DMAC 251 within the SPU 25 that is not connected to the transfer destination cache memory. The second predetermined value may be the same as or different from the first predetermined value.

Next, the MP 26 checks the number of incomplete transfer parameters 30 in each parameter queue 24311 (s3004). Here, for each DMAC, the MP 26 adds the product of the number of incomplete transfer parameters for that DMAC and a third predetermined number (a value greater than 0) to the DMAC score of that DMAC.

Finally, the MP 26 compares all the DMAC scores, and selects the DMAC 251 (s3005). Specifically, for example the DMAC 251 with the lowest DMAC score is selected. The DMAC 251 with the lowest DMAC score is closer to the transfer destination storage area than the other DMACs 251, and/or has a lower load than the other DMACs 251. Therefore, it is considered that the DMAC 251 with the lowest DMAC score is the ideal DMAC 251 to carry out the data transfer at the time of carrying out the DMAC selection process.

Further, if a fault occurs on the DMAC 251, by causing resources in which a fault has not occurred to take over the process and so on, at least one of the above first to third predetermined numbers may be taken to be smaller by the MP 26. In this way it is possible to more effectively use the resources within the SPU 25 by changing weights of scores, even if a number of normal DMACs 251 becomes imbalanced between SPUs 25 with failures.

In the present embodiment, one of the controller units 21*a* and 21*b* uses the hardware resources within the other controller. In this way, it is possible to reduce the load on the storage controller 21.

Also, in the present embodiment, the first MP11 (12) is connected to the second SPU 25*b* via the direct path D11 (12), and the second MP21 (22) is connected to the first SPU 25*a* via the direct path D21 (22). Therefore, when one of the controller units 21*a* and 21*b* uses the hardware resources within the other controller unit, going via the inter-SPU paths C1 and C2 is unnecessary.

Also, in the present embodiment, the following problems that can occur when a single DMAC is used by a plurality of MPs are solved by hardware control, not by software control.

For example, after a certain MP (x) sets a transfer parameter in the parameter queue, another MP (y) could overwrite the transfer parameter before the index is updated. In this case the transfer parameter set by the MP (x) is not executed. In addition, it is not possible to notify the MP (x) that the transfer parameter was not executed. Therefore, the host device is notified of completion of the process without the new data being reflected in the buffer or cache memory. In other words, there is the possibility of fatal faults such as loss of data or erroneous reflection of data.

It is possible to consider solving this problem by software control. Here, solving by software control means, for example, there is adjudication in advance between the MPs and the MP that obtains the authority sets the transfer parameter, or the like. However, if the above problem is solved by software control, the overhead of the resources that must be frequently accessed, such as DMACs and the like, is comparatively large, so the further problem that it is not possible to effectively use resources could occur.

In the present embodiment, a parameter queue 24311 and an index 2511 is provided in every MP 26, so it is possible to prevent faults such as the above type of data loss or erroneous reflection of data.

In the present embodiment, there is a failure management unit 257 within each SPU 25a, 25b. Therefore, it is possible for the failure management unit 257 to take measures for the resources within the SPU 25a, 25b in which a fault has occurred. For example, the failure management unit 257 can get the MP 26a, 26b that is connected to an MP port 256 where a fault has not occurred to take over the process being carried out by the MP 26a, 26b that is connected to the MP port 256 where a fault has occurred. In this way, it is possible to effectively use the resources within the SPU 25.

In the present embodiment, it is not necessary to prepare in advance fixed write data writing areas and read data writing areas in the cache data areas 241 (241a, 241b) of the cache memories 24a, 24b, as indicated below.

Figure 11A:
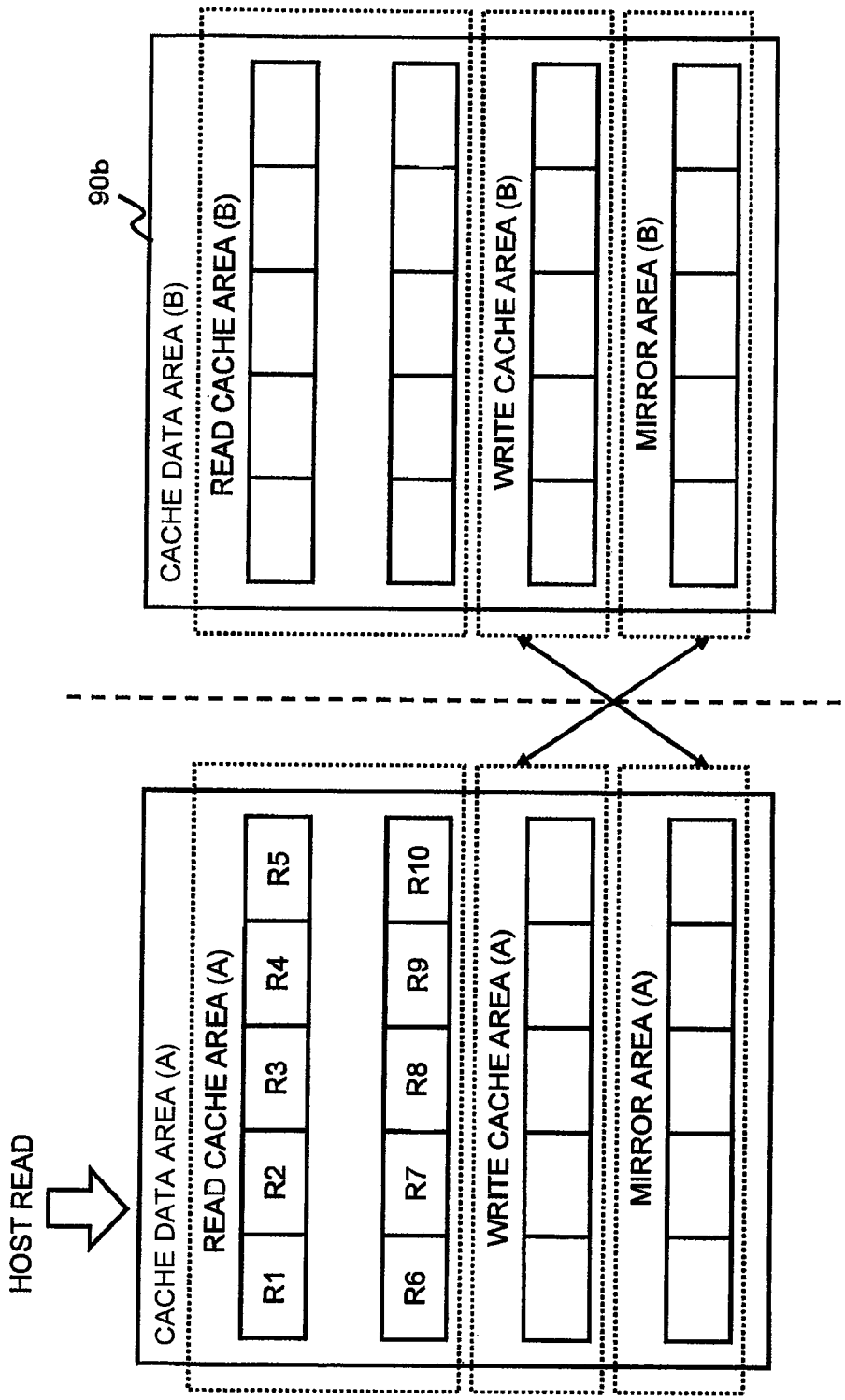
FIG. 11A shows an example of the cache use when reading for the case where the cache data area is partitioned in a fixed manner.

According to a prior arrangement shown in FIG. 11A and FIG. 11B, a read cache area (A), a write cache area (A), and a mirror area (A) are provided in advance in the cache data area (A). Likewise, a read cache area (B), a write cache area (B), and a mirror area (B) are provided in advance in the cache data area (B). The write cache area (A) and the mirror area (B) form a pair, and likewise the write cache area (B) and the mirror area (A) form a pair.

Each read cache area is a dedicated area for storing read data. As shown in FIG. 11A, only the read data (R1) to (R10) obtained by an MP (A) in the same controller unit as the read cache area (A) is stored in the read cache area (A), and write data or read data obtained by an MP (B) in a different controller unit from the read cache area (A) is not stored.

Each write cache area is a dedicated area for storing write data, and the mirror area that forms a pair with it is a dedicated area for storing mirrored write data. As shown in FIG. 11B, only the write data (W1) to (W5) that is obtained by an MP (A) within the same controller unit as the write cache area (A) is stored in the write cache area (A), and read data, write data obtained by another MP (B), or the mirror data of that write data is not stored. Also, as shown in FIG. 11B, only the mirror of the write data (W1) to (W5) obtained by the MP (A) is stored in the mirror area (B), and read data, and write data (original data) received by the MP (A) and (B) are not stored.

Figure 12A:
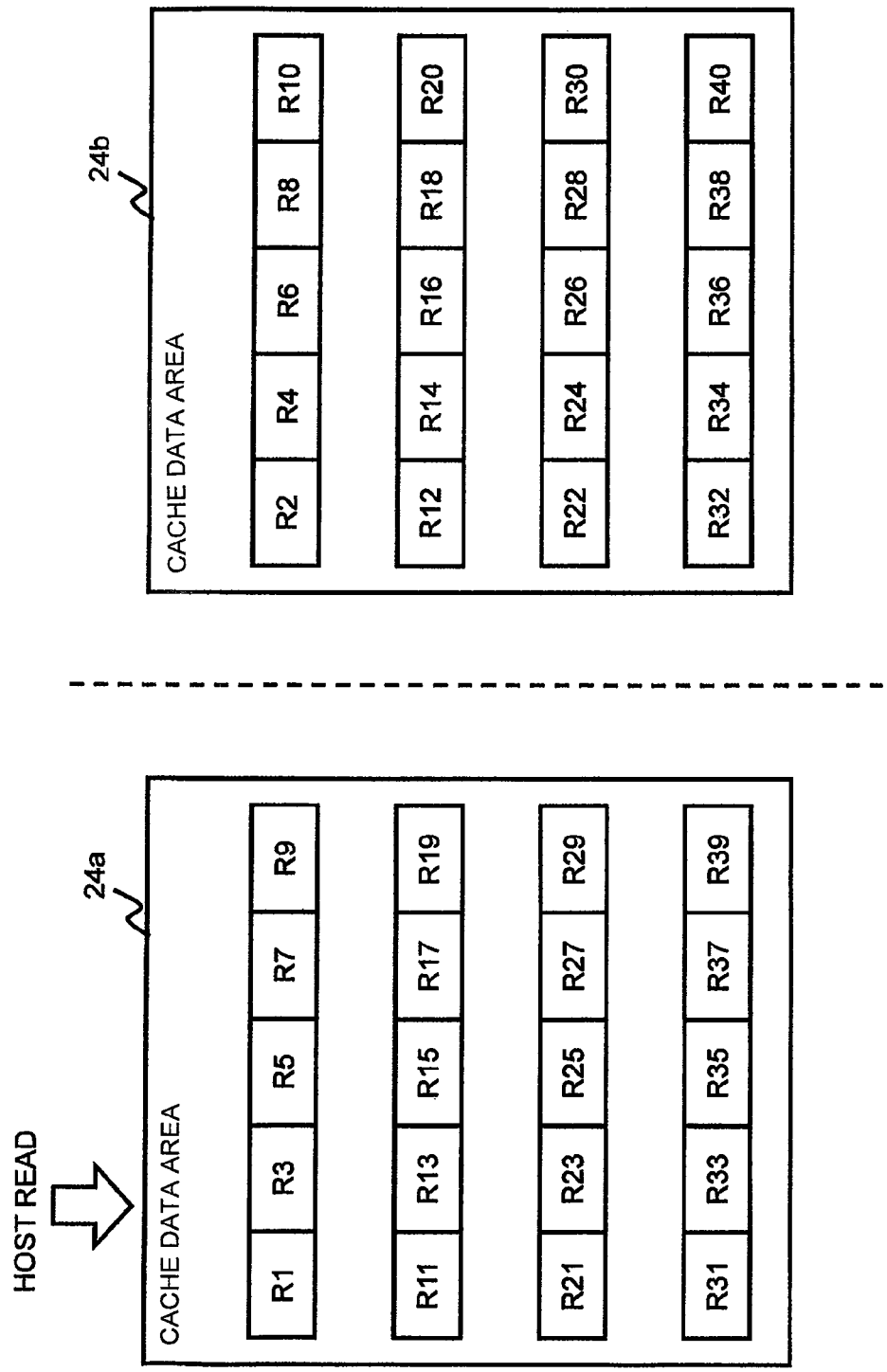
FIG. 12A shows an example of the cache use when reading in the first embodiment of the present invention.
Figure 12B:
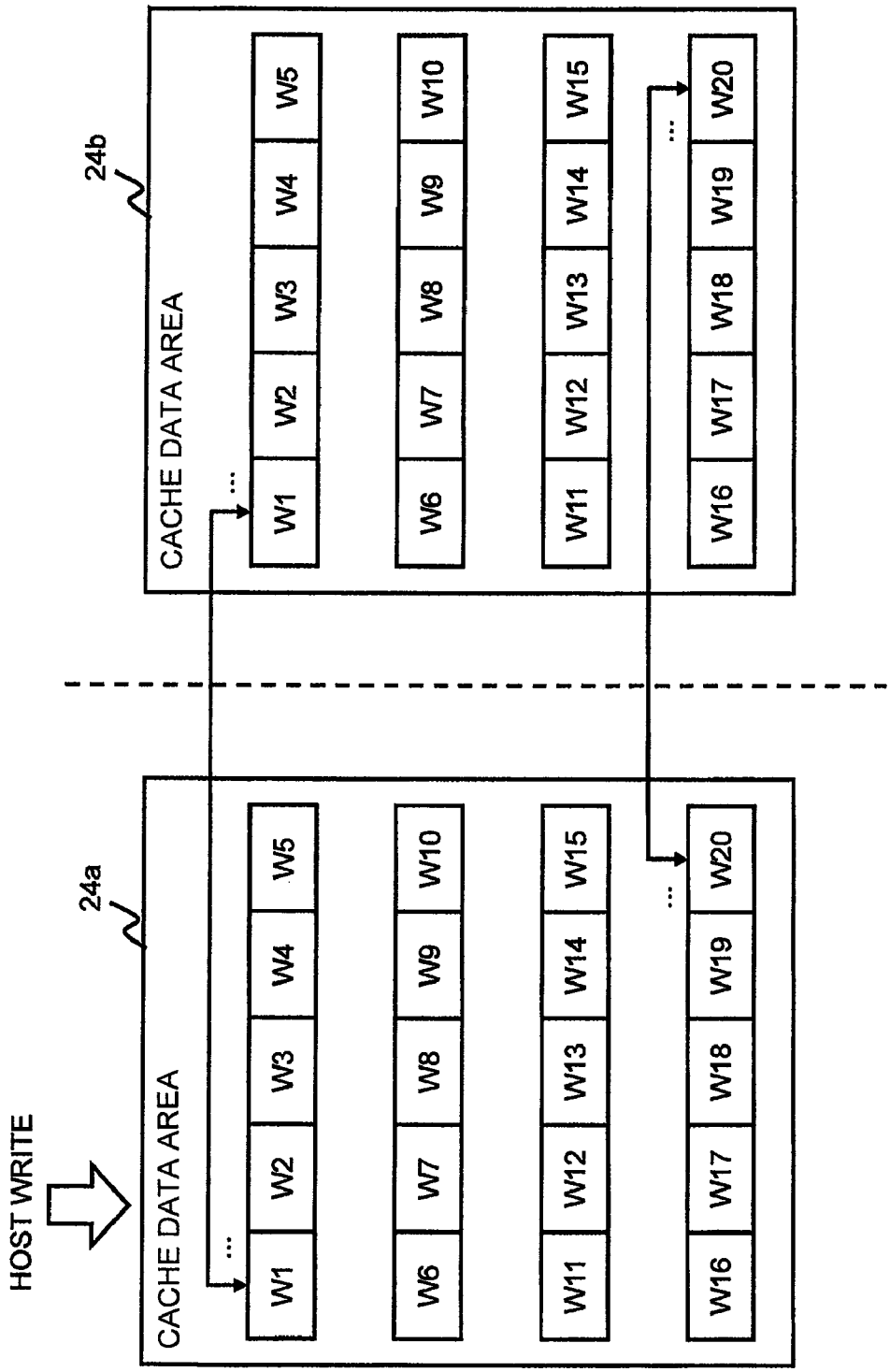
FIG. 12B shows an example of the cache use when writing in the first embodiment of the present invention.

However, in the present embodiment, neither read cache area, write cache area, nor mirror area as explained with reference to FIG. 11A and FIG. 11B are provided in the cache data area. In the present embodiment, it is possible to store data in an arbitrary slot in the cache data area, without limitation of data type. Therefore, as shown in FIG. 12A, it is possible, for example, to store a part of the read data (R1) to (R40) obtained by the first MP 24a in the first cache memory 24a, and store the remainder in the second cache memory 24b. Also, as shown in FIG. 12B, it is also possible to fill the respective cache data areas of the cache memories 24a and 24b with the write data (W1) to (W20) obtained by the first MP 24a.

Example 2

Figure 13:
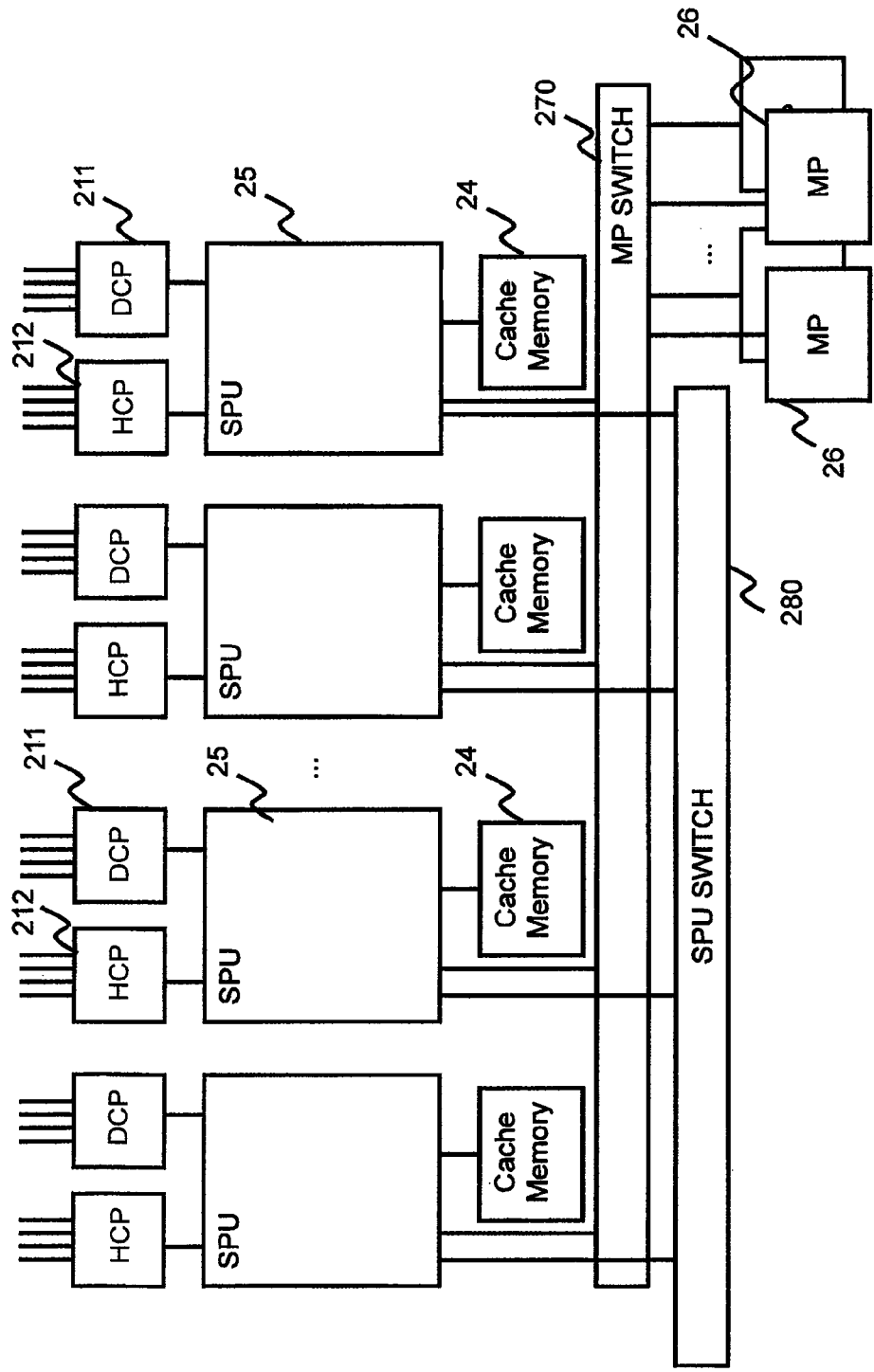
FIG. 13 is a block diagram showing the internal configuration of the storage controller of a storage system according to a second embodiment of the present invention.

FIG. 13 is a block diagram showing the internal configuration of a storage controller of a storage system according to a second embodiment of the present invention.

In the present embodiment, the normal paths and the direct paths are realized with an MP switch 270. The MP switch 270 is a switch device that connects a plurality of MP 26 and a plurality of SPU 25. Each MP 26 can access the desired SPU 25 via the MP switch 270.

Also, in the present embodiment, the inter-SPU path is realized with an SPU switch 280. Communication between one of a plurality of SPU 25 and another one of the plurality of SPU 25 is carried out via the SPU switch 280.

In order to make the number of SPU 25, the number of MP 26, and a number of cache memories 24 scalable, a configuration such as that of the present embodiment may be adopted. In this case, the MP switch 270 and the SPU switch 280 may have a logical configuration, and physically they may be configured as the same switch. For example, PCI-Express virtual channel technology may be used. Also, MP switch 270 and/or SPU switch 280 may be constructed of a plurality of switches with cascading connection.

Also, to further improve the scalability of the cache memory, the cache memory may be made independent. In this case, for example, an SPU having only a cache memory function may be connected to the SPU switch.

Example 3

Figure 14:
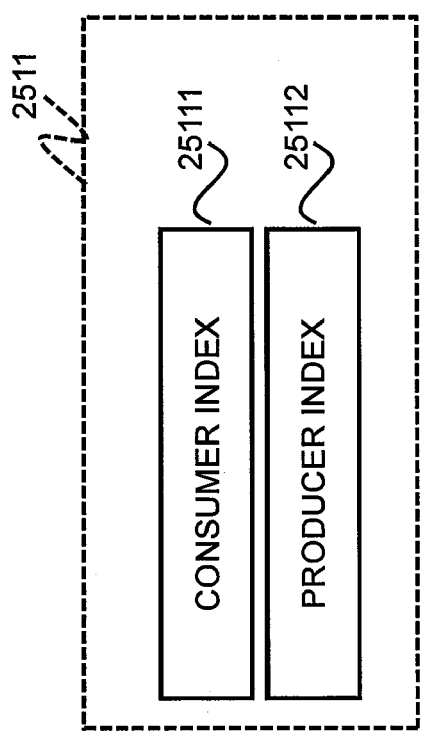
FIG. 14 shows an index in a third embodiment of the present invention.

FIG. 14 shows an index in a third embodiment of the present invention.

The index 2511 is constituted as a consumer index 25111 and a producer index 25112.

The consumer index 25111 stores a value representing what transfer parameters have been fetched from among the one or more transfer parameters accumulated in the parameter queue.

The producer index 25112 is a value representing the last transfer parameter stored in the parameter queue.

Using this type of index 2511, it is possible to determine from where in a parameter queue transfer parameters should be read.

Example 4

Figure 15:
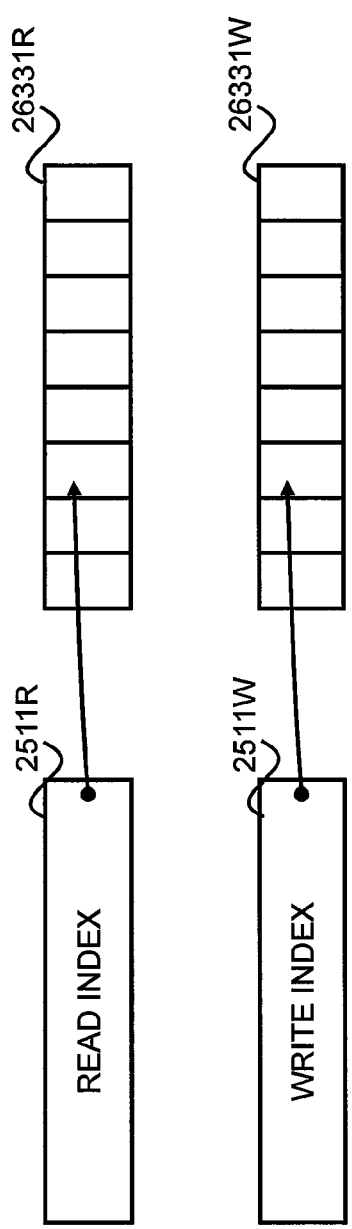
FIG. 15 shows indexes and the configuration of parameter queues in a fourth embodiment of the present invention.

FIG. 15 shows the constitution of indexes and parameter queues in a fourth embodiment of the present invention.

For each MP, there is a read parameter queue 26331R and a write parameter queue 26331W. Also, for each MP there is a read index 2511R corresponding to the read parameter queue 26331R and a write index 2511W corresponding to the write parameter queue 26331W.

The MP stores transfer parameters generated in processing read requests in the read parameter queue 26331R. The read index 2511R stores a value representing the number of unprocessed transfer parameters in the read parameter queue 26331R.

The MP stores transfer parameters generated in processing write requests in the write parameter queue 26331W. The write index 2511W stores a value representing the number of unprocessed transfer parameters in the write parameter queue 26331W.

For example, in processing a write request, if the write data is stored in the cache memory, it is possible to complete the write process with respect to the host device, but in processing a read request, the read process is not complete just when the read data is stored in cache memory, but when it is transferred to the host device.

Therefore, in the present embodiment, the DMAC fetches transfer parameters stored in the read parameter queue 26331R in priority to transfer parameters stored in the write parameter queue 26331W. It this way, it is possible to improve the read performance.

Several embodiments of the present invention were explained above, but the present invention is not limited to these embodiments, and various kinds of changes can be made without deviating from the scope of its essence.

The invention claimed is:

1. A storage control device, comprising:
a first controller; and
a second controller connected to the first controller via a first path,
wherein when the first controller or the second controller receives an input/output (I/O) command issued by a host device, the controller receiving the I/O command carries out an I/O process, in accordance with the I/O command, and carries out I/O of data in accordance with the I/O command with respect to a storage device during the I/O process,
the first controller includes:
a first relay circuit, which is a circuit that controls data transfer; and
a first processor connected to the first relay circuit via a first second path,
the second controller includes:
a second relay circuit, which is a circuit that controls data transfer, and which is connected to the first relay circuit via the first path; and
a second processor connected to the second relay circuit via a second second path,
the first processor is connected to the second relay circuit directly via a first third path which is different from the first path and the first second path, not via the first relay circuit, the first path and the first second path, while the first controller is carrying out the I/O process,
when the first processor sends the first relay circuit an instruction of data transfer using a resource of the first relay circuit, the first processor accesses the first relay circuit via the first second path, and
when the first processor sends the second relay circuit an instruction of data transfer using a resource of the second relay circuit, the first processor accesses the second relay circuit via the first third path, and
the second processor is connected to the first relay circuit directly via a second third path which is different from the first path and the second second path, not via the second relay circuit, the first path and the second second path,
when the second processor sends the second relay circuit an instruction of data transfer using resource of the second relay circuit, the second processor accesses the second relay circuit via the second second path, and
when the second processor sends the first relay circuit an instruction of data transfer using resource of the first relay circuit, the second processor accesses the first relay circuit via the second third path.

2. The storage control device according to claim 1, wherein
the first relay circuit includes a first data transfer circuit, which is a circuit that carries out data transfer,
the second relay circuit includes a second data transfer circuit, which is a circuit that carries out data transfer,
the first controller includes a first memory coupled to the first relay circuit, and a first queue that is provided for each processor and accumulates transfer parameters which are parameters for data transfer,
each first queue is a queue for the first data transfer circuit,
the second controller includes a second memory coupled to the second relay circuit, and a second queue that is provided for each processor and accumulates transfer parameters,
each second queue is a queue for the second data transfer circuit,
the transfer parameters are generated by the first and second processors, and include a transfer source address, which is an address of a storage area of a transfer source of data, and a transfer destination address, which is an address of a transfer destination of the data,
the first data transfer circuit includes a plurality of first indexes which are storage areas for storing the number of transfer parameters accumulated in a plurality of first queues respectively, a first selector that selects a single first index from the plurality of first indexes, a first parameter obtaining circuit that obtains a transfer parameter from the first queue corresponding to the first index selected by the first selector and sets the transfer source address and the transfer destination address contained in the transfer parameter, and a first transfer control circuit that transfers data in a storage area represented by the set transfer source address to a storage area represented by the set transfer destination address,
the second data transfer circuit includes a plurality of second indexes which are storage areas for storing the number of transfer parameters accumulated in a plurality of second queues respectively, a second selector that selects a single second index from the plurality of second indexes, a second parameter obtaining circuit that obtains a transfer parameter from the second queue corresponding to the second index selected by the second selector and sets the transfer source address and the transfer destination address contained in the transfer parameter, and a second transfer control circuit that transfers data in a storage area represented by the set transfer source address to a storage area represented by the set transfer destination address, and
a target processor, which is the processor that has received an I/O command from among the first and second processors, selects a data transfer circuit from among the first and second data transfer circuits based on the following (A) and (B):
(A) whether or not the storage area of the data transfer destination is within a target controller, which is a controller including the target processor;
(B) a first number, which is the number of incomplete transfer parameters in the first queue corresponding to the target processor, and a second number, which is the number of incomplete transfer parameters in the second queue corresponding to the target processor,
and the target processor stores the transfer parameter in the queue corresponding to the target processor within the controller including the selected data transfer circuit.

3. The storage control device according to claim 2, wherein the target processor selects in priority the data transfer circuit that complies with the following conditions (X) and (Y);
(X) the data transfer circuit which exists in the target controller when the transfer destination storage area is within the target controller;
(Y) the data transfer circuit corresponding to the smaller of the first number and the second number.

4. The storage control device according to claim 3, wherein the first memory includes a first cache memory area,
the second memory includes a second cache memory area,
the first processor stores the transfer parameter containing an address of an arbitrary location of the second cache memory as the transfer destination address of the data in accordance with a received I/O command, in the second queue corresponding to the first processor via the first third path, and the second processor stores the transfer parameter containing an address of an arbitrary location of the first cache memory as the transfer destination address of the data in accordance with a received I/O command, in the first queue corresponding to the first processor via the second third path.

5. The storage control device according to claim 1, further comprising a first parameter area that is provided for each processor and stores transfer parameters which are parameters for data transfer, and a second parameter area that is provided for each processor and stores transfer parameters, wherein the first relay circuit includes a first data transfer circuit, which is a circuit that carries out transfer of data, wherein the second relay circuit includes a second data transfer circuit, which is a circuit that carries out transfer of data, wherein the first parameter area is a storage area for the first data transfer circuit, wherein the second parameter area is a storage area for the second data transfer circuit, wherein the first processor stores transfer parameters in the first parameter area corresponding to the first processor when using the first data transfer circuit, and stores transfer parameters in the second parameter area corresponding to the first processor when using the second data transfer circuit, wherein the second processor stores transfer parameters in the second parameter area corresponding to the second processor when using the second data transfer circuit, and stores transfer parameters in the first parameter area corresponding to the second processor when using the first data transfer circuit, wherein the first data transfer circuit obtains a transfer parameter from any of the first parameter areas, and executes the data transfer in accordance with the transfer parameter, and wherein the second data transfer circuit obtains a transfer parameter from any of the second parameter areas, and executes the data transfer in accordance with the transfer parameter.

6. The storage control device according to claim 5, wherein a target processor, which is the processor that has received an I/O command from among the first and second processors, selects a data transfer circuit within a target controller which is the controller including the target processor when the data transfer destination storage area is in the target controller, and stores the transfer parameter in the parameter area corresponding to the target processor in the controller including the selected data transfer circuit.

7. The storage control device according to claim 5, wherein a target processor, which is the processor that has received an I/O command from among the first and second processors, selects a data transfer circuit corresponding to the smaller of the number of unprocessed transfer parameters in the first parameter area corresponding to the target processor and the number of unprocessed transfer parameters in the second parameter area corresponding to the target processor, and stores the transfer parameter in the parameter area corresponding to the target processor in the controller including the selected transfer circuit.

8. The storage control device according to claim 5, wherein the first controller includes a first cache memory area coupled to the first relay device, the second controller includes a second cache memory area coupled to the second relay device, the first processor stores the transfer parameter with an arbitrary address within the second cache memory area as the transfer destination address, in the second parameter area corresponding to the first processor, and the second processor stores the transfer parameter with an arbitrary address within the first cache memory area as the transfer destination address, in the first parameter area corresponding to the second processor.

9. The storage control device according to claim 5, wherein the first parameter area includes a first parameter write area serving as a storage destination for transfer parameters for the case where the I/O command is a write command, and a first parameter read area serving as a storage destination for transfer parameters for the case where the I/O command is a read command, the second parameter area includes a second parameter write area serving as a storage destination for transfer parameters for the case where the I/O command is a write command, and a second parameter read area serving as a storage destination for transfer parameters for the case where the I/O command is a read command, the first data transfer circuit obtains unprocessed transfer parameters in the first parameter read area in priority to those in the first parameter write area, and the second data transfer circuit obtains unprocessed transfer parameters in the second parameter read area in priority to those in the second parameter write area.

10. The storage control device according to claim 5, wherein the first data transfer circuit includes a plurality of first indexes which are storage areas for storing the number of unprocessed transfer parameters accumulated in a plurality of first parameter areas respectively, a first selector that selects a single first index from the plurality of first indexes, a first parameter obtaining circuit that obtains a transfer parameter from the first parameter area corresponding to the first index selected by the first selector and sets the transfer source address and the transfer destination address contained in the transfer parameter, and a first transfer control circuit that transfers data in a storage area represented by the set transfer source address to a storage area represented by the set transfer destination address, and the second data transfer circuit includes a plurality of second indexes which are storage areas for storing the number of unprocessed transfer parameters accumulated in a plurality of second parameter areas respectively, a second selector that selects a single second index from the plurality of second indexes, a second parameter obtaining circuit that obtains a transfer parameter from the second parameter area corresponding to the second index selected by the second selector and sets the transfer source address and the transfer destination address contained in the transfer parameter, and a second transfer control circuit that transfers data in a storage area represented by the set transfer source address to a storage area represented by the set transfer destination address.

11. The storage control device according to claim 1, wherein the each of the first and second relay circuits include processor ports connected the first and second processors, and a fault monitoring unit that monitors the occurrence of faults of the processors ports, wherein when detecting a fault on any one of the processor ports, the fault monitoring unit notifies both the first and second processors of the fault on the processor port.

12. The storage control device according to claim 11, wherein the fault monitoring unit which has detected the fault transfers a process of one of the first and second processors which is connected to the processor port in which the fault has occurred to another one of the first and second processors.

13. A storage control device, comprising:

a first controller; and a second controller coupled to the first controller via a first path, wherein when the first controller or the second controller receives an input/output (I/O) command issued by a host device, the controller receiving the I/O command carries out I/O process, which is process in accordance with the I/O command, and carries out I/O of data in accordance with the I/O command with respect to a storage device during the I/O process, the first controller includes:

a first relay circuit, which is a circuit that controls data transfer; and a first processor coupled to the first relay circuit via a first second path, the second controller includes:

a second relay circuit, which is a circuit that controls data transfer, and which is coupled to the first relay circuit via the first path; and a second processor coupled to the second relay circuit via a second second path, the first processor is coupled to the second relay circuit not via the first relay circuit but via a first third path, and accesses the second relay circuit via the first third path during the I/O process when the first controller is carrying out the I/O process, and the second processor is coupled to the first relay circuit not via the second relay circuit but via a second third path, and accesses the first relay circuit via the second third path during the I/O processes when the second controller is carrying out the I/O process, wherein:

the first relay circuit includes a first data transfer circuit, which is a circuit that carries out data transfer, the second relay circuit includes a second data transfer circuit, which is a circuit that carries out data transfer, the first controller includes a first memory coupled to the first relay circuit, and a first queue that is provided for each processor and accumulates transfer parameters which are parameters for data transfer, each first queue is a queue for the first data transfer circuit, the second controller includes a second memory coupled to the second relay circuit, and a second queue that is provided for each processor and accumulates transfer parameters, each second queue is a queue for the second data transfer circuit, the transfer parameters are generated by the first and second processors, and include a transfer source address, which is an address of a storage area of a transfer source of data, and a transfer destination address, which is an address of a transfer destination of the data, the first data transfer circuit includes a plurality of first indexes which are storage areas for storing the number of transfer parameters accumulated in a plurality of first queues respectively, a first selector that selects a single first index from the plurality of first indexes, a first parameter obtaining circuit that obtains a transfer parameter from the first queue corresponding to the first index selected by the first selector and sets the transfer source address and the transfer destination address contained in the transfer parameter, and a first transfer control circuit that transfers data in a storage area represented by the set transfer source address to a storage area represented by the set transfer destination address, the second data transfer circuit includes a plurality of second indexes which are storage areas for storing the number of transfer parameters accumulated in a plurality of second queues respectively, a second selector that selects a single second index from the plurality of second indexes, a second parameter obtaining circuit that obtains a transfer parameter from the second queue corresponding to the second index selected by the second selector and sets the transfer source address and the transfer destination address contained in the transfer parameter, and a second transfer control circuit that transfers data in a storage area represented by the set transfer source address to a storage area represented by the set transfer destination address, and a target processor, which is the processor that has received an I/O command from among the first and second processors, selects a data transfer circuit from among the first and second data transfer circuits based on the following (A) and (B):

(A) whether or not the storage area of the data transfer destination is within a target controller, which is a controller including the target processor;

(B) a first number, which is the number of incomplete transfer parameters in the first queue corresponding to the target processor, and a second number, which is the number of incomplete transfer parameters in the second queue corresponding to the target processor, and the target processor stores the transfer parameter in the queue corresponding to the target processor within the controller including the selected data transfer circuit.

14. A storage control device, comprising:

a first controller;

a second controller coupled to the first controller via a first path, wherein when the first controller or the second controller receives an input/output (I/O) command issued by a host device, the controller receiving the I/O command carries out I/O process, which is process in accordance with the I/O command, and carries out I/O of data in accordance with the I/O command with respect to a storage device during the I/O process, the first controller includes:

a first relay circuit, which is a circuit that controls data transfer; and a first processor coupled to the first relay circuit via a first second path, the second controller includes:

a second relay circuit, which is a circuit that controls data transfer, and which is coupled to the first relay circuit via the first path; and a second processor coupled to the second relay circuit via a second second path, the first processor is coupled to the second relay circuit not via the first relay circuit but via a first third path, and accesses the second relay circuit via the first third path during the I/O process when the first controller is carrying out the I/O process, and the second processor is coupled to the first relay circuit not via the second relay circuit but via a second third path, and accesses the first relay circuit via the second third path during the I/O processes when the second controller is carrying out the I/O process;
a first parameter area is provided for each processor and stores transfer parameters which are parameters for data transfer, and a second parameter area that is provided for each processor and stores transfer parameters,
wherein the first relay circuit includes a first data transfer circuit, which is a circuit that carries out transfer of data,
wherein the second relay circuit includes a second data transfer circuit, which is a circuit that carries out transfer of data,
wherein the first parameter area is a storage area for the first data transfer circuit,
wherein the second parameter area is a storage area for the second data transfer circuit,
wherein the first processor stores transfer parameters in the first parameter area corresponding to the first processor when using the first data transfer circuit, and stores transfer parameters in the second parameter area corresponding to the first processor when using the second data transfer circuit,
wherein the second processor stores transfer parameters in the second parameter area corresponding to the second processor when using the second data transfer circuit, and stores transfer parameters in the first parameter area corresponding to the second processor when using the first data transfer circuit,
wherein the first data transfer circuit obtains a transfer parameter from any of the first parameter areas, and executes the data transfer in accordance with the transfer parameter, and
wherein the second data transfer circuit obtains a transfer parameter from any of the second parameter areas, and executes the data transfer in accordance with the transfer parameter.

* * * * *